US012677208B2

(12) United States Patent
Wu

(10) Patent No.: US 12,677,208 B2
(45) Date of Patent: Jul. 7, 2026

(54) MANAGING UE MEASUREMENTS IN AN IDLE OR INACTIVE STATE

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 236 days.

(21) Appl. No.: 18/569,067

(22) PCT Filed: Jul. 28, 2022

(86) PCT No.: PCT/US2022/038621
§ 371 (c)(1),
(2) Date: Dec. 11, 2023

(87) PCT Pub. No.: WO2023/009691
PCT Pub. Date: Feb. 2, 2023

(65) Prior Publication Data
US 2024/0406846 A1      Dec. 5, 2024

Related U.S. Application Data

(60) Provisional application No. 63/226,528, filed on Jul. 28, 2021.

(51) Int. Cl.
*H04W 48/10*      (2009.01)
*H04W 24/08*      (2009.01)
*H04W 48/18*      (2009.01)

(52) U.S. Cl.
CPC ........... *H04W 48/10* (2013.01); *H04W 24/08* (2013.01); *H04W 48/18* (2013.01)

(58) Field of Classification Search
CPC . H04W 76/27; H04W 74/0833; H04W 48/12; H04W 48/10; H04W 28/02;
(Continued)

(56) References Cited

U.S. PATENT DOCUMENTS 10,212,739 B2      2/2019  Ianev et al.
2021/0127449 A1      4/2021  da Silva et al.
(Continued)

FOREIGN PATENT DOCUMENTS

WO      WO-2019/082122 A1      5/2019
WO      WO-2020/067763 A1      4/2020
(Continued)

OTHER PUBLICATIONS

International Search Report and Written Opinion for Application No. PCT/US2022/038621, dated Feb. 13, 2023.
(Continued)

*Primary Examiner* — Allahyar Kasraian
(74) *Attorney, Agent, or Firm* — MARSHALL, GERSTEIN & BORUN LLP

(57)      ABSTRACT

A user equipment (UE) can perform a method for managing inter-frequency measurements. The method includes: determining (902) one or more carrier frequencies for inter-frequency measurements while a radio connection between the UE and the RAN is not active; determining (904) that data is available for early data communication between the UE and a core network (CN); and determining (906) whether to suspend (i) inter-frequency measurements on at least one of the carrier frequencies or (ii) the early data communication.

9 Claims, 15 Drawing Sheets

(58) Field of Classification Search
CPC ..... H04W 48/14; H04W 48/18; H04W 76/19;
H04W 76/30
See application file for complete search history.

(56) References Cited

U.S. PATENT DOCUMENTS

| | | | |
|---|---|---|---|
| 2021/0227586 A1 | 7/2021 | Huang et al. | |
| 2022/0095410 A1* | 3/2022 | Shih ..................... | H04B 7/0695 |
| 2022/0225257 A1* | 7/2022 | Laselva ............. | H04W 56/0095 |
| 2024/0163960 A1* | 5/2024 | Wang ................. | H04W 12/041 |

FOREIGN PATENT DOCUMENTS

| | | |
|---|---|---|
| WO | WO-2020/263283 A1 | 12/2020 |
| WO | WO-2021/093431 A1 | 5/2021 |

OTHER PUBLICATIONS

Nokia et al., "Faster Idle Mode Measurements," 3GPP Draft (Oct. 8, 2017).
Huawei et al., "Remaining Issues for EDT in the CP Solution for eMTC and NB-IoT," 3GPP Draft (Feb. 15, 2018).
Office Action for European Application No. 22755027.4, dated Jun. 30, 2025.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.4.0 (2020).
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.16.0 (2020).

* cited by examiner

300A

300B

300C

300D

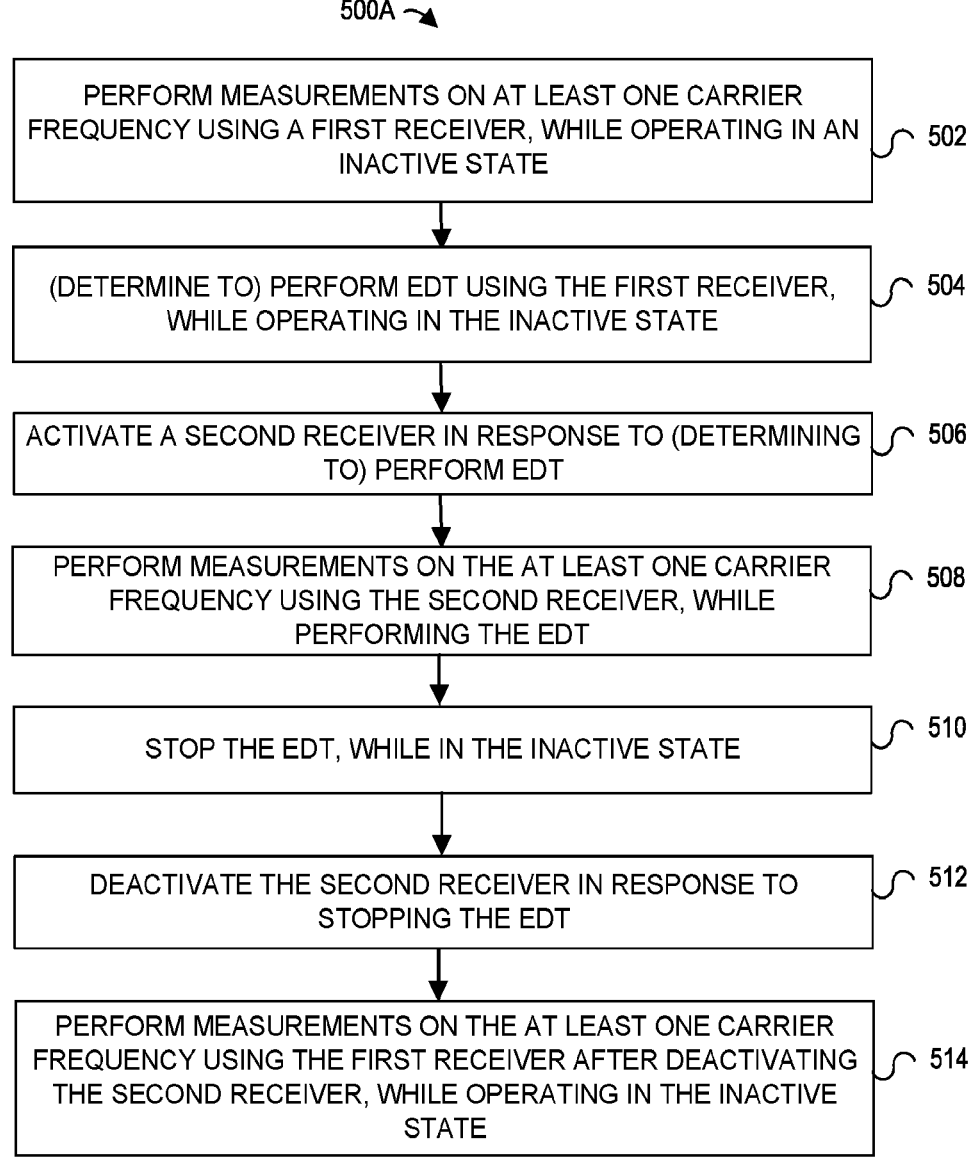

500A

PERFORM MEASUREMENTS ON AT LEAST ONE CARRIER FREQUENCY USING A FIRST RECEIVER, WHILE OPERATING IN AN INACTIVE STATE — 502

(DETERMINE TO) PERFORM EDT USING THE FIRST RECEIVER, WHILE OPERATING IN THE INACTIVE STATE — 504

ACTIVATE A SECOND RECEIVER IN RESPONSE TO (DETERMINING TO) PERFORM EDT — 506

PERFORM MEASUREMENTS ON THE AT LEAST ONE CARRIER FREQUENCY USING THE SECOND RECEIVER, WHILE PERFORMING THE EDT — 508

STOP THE EDT, WHILE IN THE INACTIVE STATE — 510

DEACTIVATE THE SECOND RECEIVER IN RESPONSE TO STOPPING THE EDT — 512

PERFORM MEASUREMENTS ON THE AT LEAST ONE CARRIER FREQUENCY USING THE FIRST RECEIVER AFTER DEACTIVATING THE SECOND RECEIVER, WHILE OPERATING IN THE INACTIVE STATE — 514

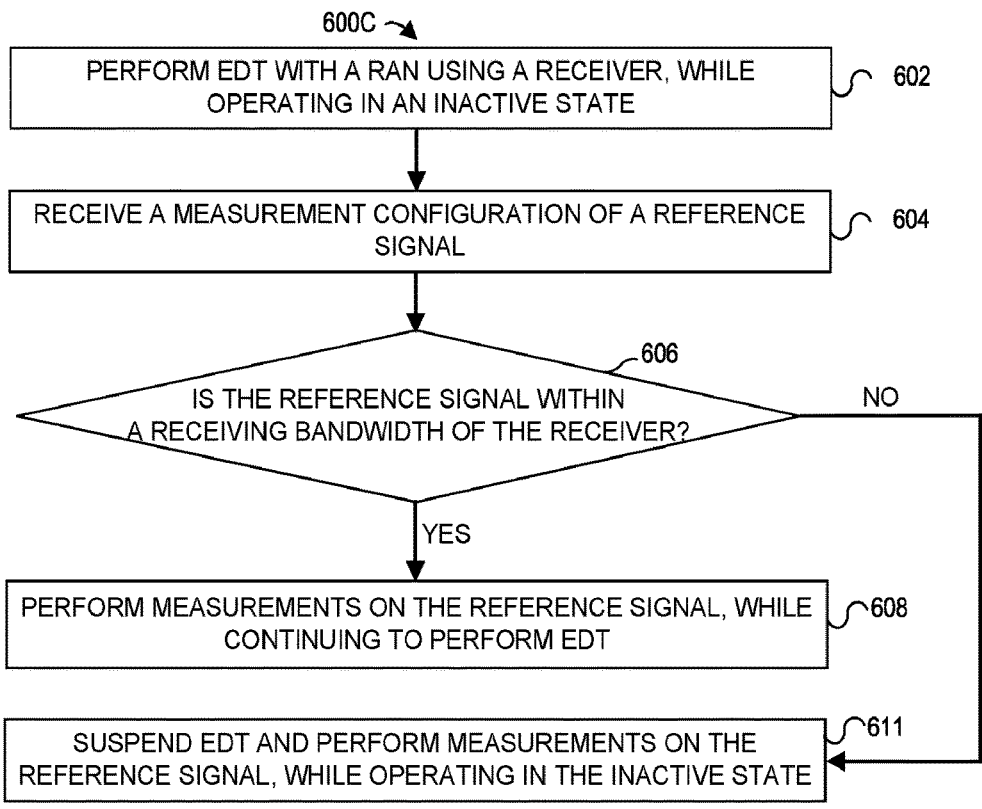

PERFORM EDT WITH A RAN USING A RECEIVER, WHILE OPERATING IN AN INACTIVE STATE — 602

RECEIVE A MEASUREMENT CONFIGURATION OF A REFERENCE SIGNAL — 604

606 IS THE REFERENCE SIGNAL WITHIN A RECEIVING BANDWIDTH OF THE RECEIVER? — NO

YES

PERFORM MEASUREMENTS ON THE REFERENCE SIGNAL, WHILE CONTINUING TO PERFORM EDT — 608

SUSPEND EDT AND PERFORM MEASUREMENTS ON THE REFERENCE SIGNAL, WHILE OPERATING IN THE INACTIVE STATE — 611

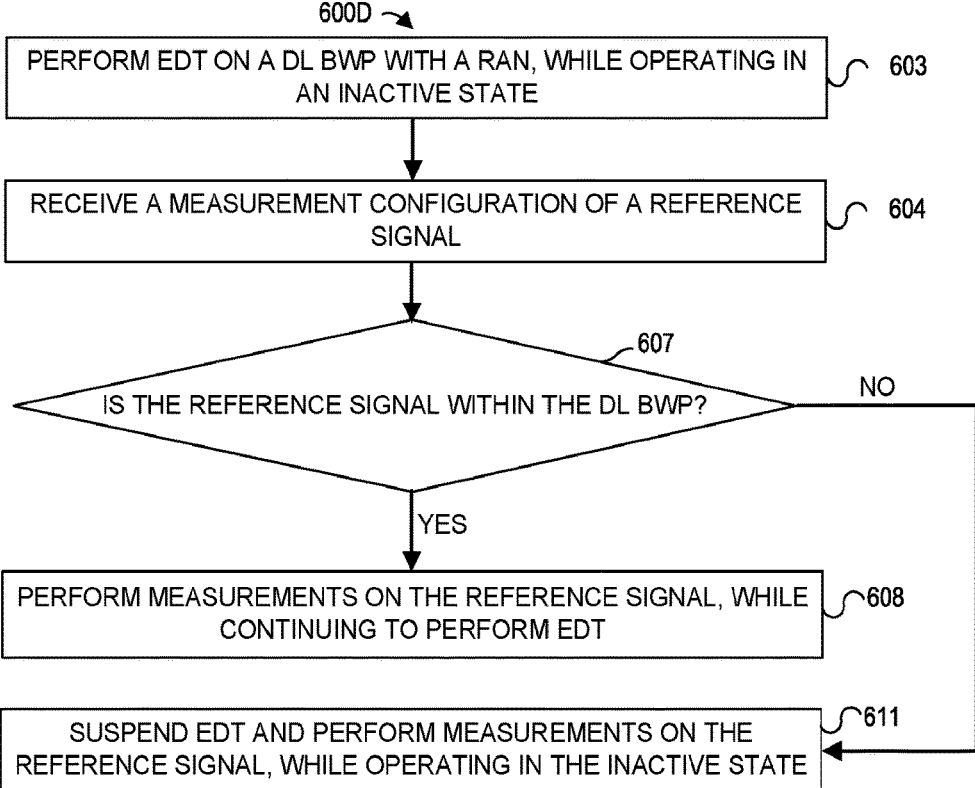

PERFORM EDT ON A DL BWP WITH A RAN, WHILE OPERATING IN AN INACTIVE STATE — 603

RECEIVE A MEASUREMENT CONFIGURATION OF A REFERENCE SIGNAL — 604

607 IS THE REFERENCE SIGNAL WITHIN THE DL BWP? — NO

YES

PERFORM MEASUREMENTS ON THE REFERENCE SIGNAL, WHILE CONTINUING TO PERFORM EDT — 608

SUSPEND EDT AND PERFORM MEASUREMENTS ON THE REFERENCE SIGNAL, WHILE OPERATING IN THE INACTIVE STATE — 611

Figure 6D

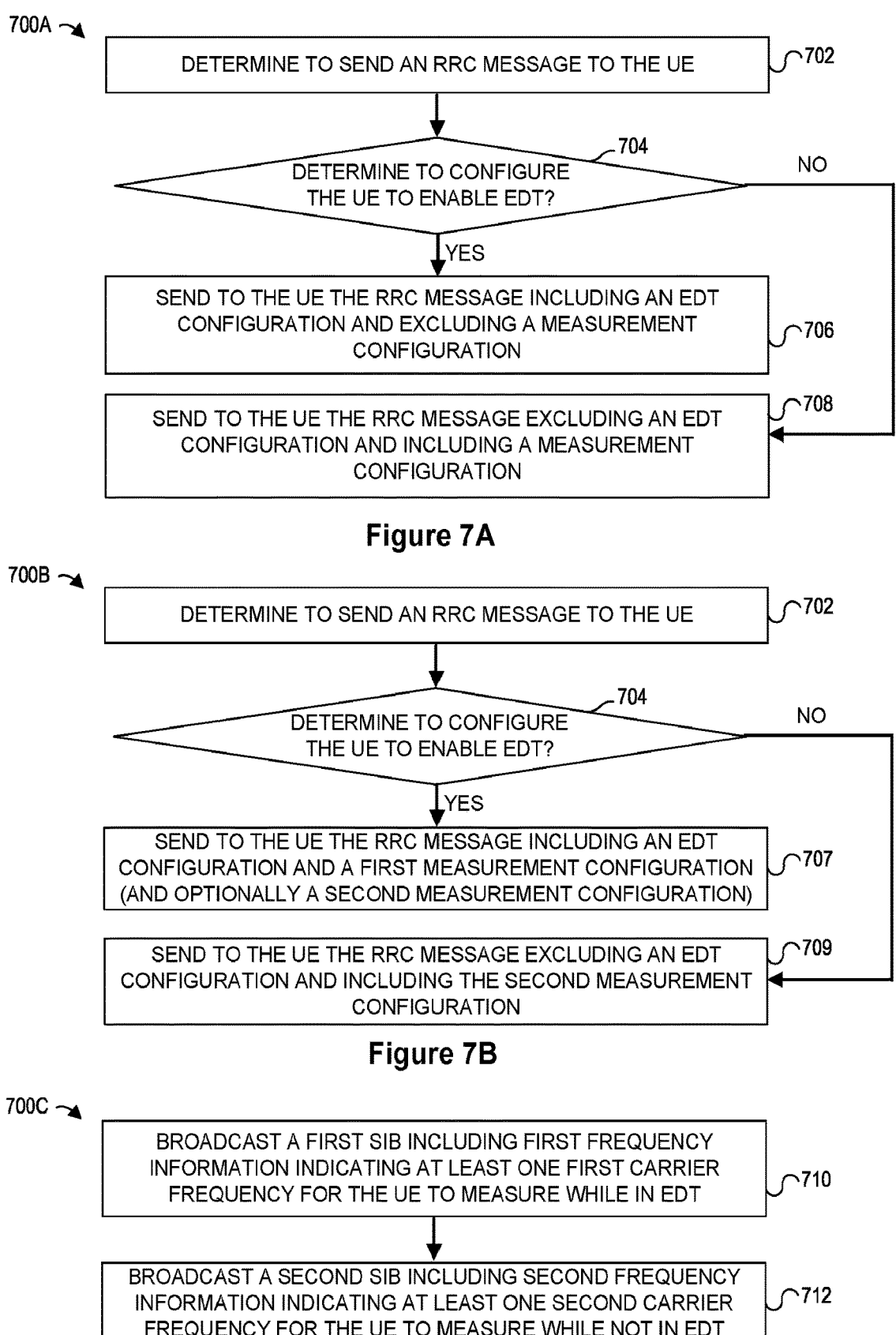

700A

DETERMINE TO SEND AN RRC MESSAGE TO THE UE ⌇702

DETERMINE TO CONFIGURE THE UE TO ENABLE EDT? 704        NO

YES

SEND TO THE UE THE RRC MESSAGE INCLUDING AN EDT CONFIGURATION AND EXCLUDING A MEASUREMENT CONFIGURATION ⌇706

SEND TO THE UE THE RRC MESSAGE EXCLUDING AN EDT CONFIGURATION AND INCLUDING A MEASUREMENT CONFIGURATION ⌇708

DETERMINE TO SEND AN RRC MESSAGE TO THE UE ⌇702

DETERMINE TO CONFIGURE THE UE TO ENABLE EDT? 704        NO

YES

SEND TO THE UE THE RRC MESSAGE INCLUDING AN EDT CONFIGURATION AND A FIRST MEASUREMENT CONFIGURATION (AND OPTIONALLY A SECOND MEASUREMENT CONFIGURATION) ⌇707

SEND TO THE UE THE RRC MESSAGE EXCLUDING AN EDT CONFIGURATION AND INCLUDING THE SECOND MEASUREMENT CONFIGURATION ⌇709

BROADCAST A FIRST SIB INCLUDING FIRST FREQUENCY INFORMATION INDICATING AT LEAST ONE FIRST CARRIER FREQUENCY FOR THE UE TO MEASURE WHILE IN EDT ⌇710

BROADCAST A SECOND SIB INCLUDING SECOND FREQUENCY INFORMATION INDICATING AT LEAST ONE SECOND CARRIER FREQUENCY FOR THE UE TO MEASURE WHILE NOT IN EDT ⌇712

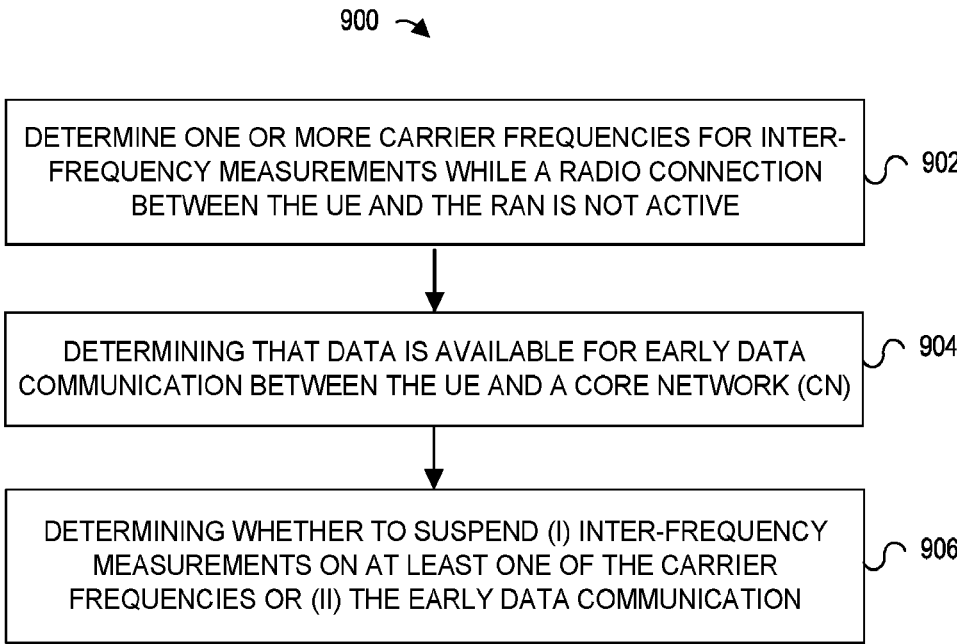

DETERMINE ONE OR MORE CARRIER FREQUENCIES FOR INTER-FREQUENCY MEASUREMENTS WHILE A RADIO CONNECTION BETWEEN THE UE AND THE RAN IS NOT ACTIVE — 902

DETERMINING THAT DATA IS AVAILABLE FOR EARLY DATA COMMUNICATION BETWEEN THE UE AND A CORE NETWORK (CN) — 904

DETERMINING WHETHER TO SUSPEND (I) INTER-FREQUENCY MEASUREMENTS ON AT LEAST ONE OF THE CARRIER FREQUENCIES OR (II) THE EARLY DATA COMMUNICATION — 906

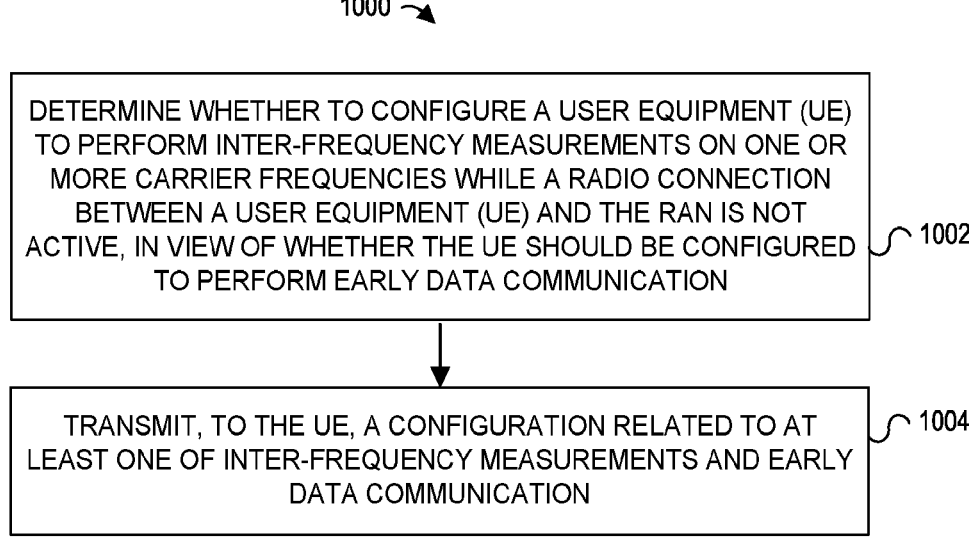

DETERMINE WHETHER TO CONFIGURE A USER EQUIPMENT (UE) TO PERFORM INTER-FREQUENCY MEASUREMENTS ON ONE OR MORE CARRIER FREQUENCIES WHILE A RADIO CONNECTION BETWEEN A USER EQUIPMENT (UE) AND THE RAN IS NOT ACTIVE, IN VIEW OF WHETHER THE UE SHOULD BE CONFIGURED TO PERFORM EARLY DATA COMMUNICATION — 1002

TRANSMIT, TO THE UE, A CONFIGURATION RELATED TO AT LEAST ONE OF INTER-FREQUENCY MEASUREMENTS AND EARLY DATA COMMUNICATION — 1004

MANAGING UE MEASUREMENTS IN AN IDLE OR INACTIVE STATE

CROSS-REFERENCE TO RELATED APPLICATIONS

This patent application is a national stage application, filed under 35 U.S.C. §371, of International Application No. PCT/US2022/038621, filed Jul. 28, 2022 and entitled "MANAGING UE MEASUREMENTS IN AN IDLE OR INACTIVE STATE," which claims priority to U.S. Provisional Application No. 63/226,528, filed Jul. 28, 2021 and entitled "MANAGING UE MEASUREMENTS IN AN IDLE OR INACTIVE STATE," the disclosures of which are incorporated by reference herein in their entireties.

FIELD OF THE DISCLOSURE

This disclosure relates generally to wireless communications and, more particularly, to performing measurement at a user equipment (UE) when the UE operates in an inactive or idle state associated with a protocol for controlling radio resources and communicates uplink and/or downlink data with a radio access network (RAN).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, a base station operating a cellular radio access network (RAN) communicates with a user equipment (UE) using a certain radio access technology (RAT) and multiple layers of a protocol stack. For example, the physical layer (PHY) of a RAT provides transport channels to the Medium Access Control (MAC) sublayer, which in turn provides logical channels to the Radio Link Control (RLC) sublayer, and the RLC sublayer in turn provides data transfer services to the Packet Data Convergence Protocol (PDCP) sublayer. The Radio Resource Control (RRC) sublayer is disposed above the PDCP sublayer.

The RRC sublayer specifies the RRC_IDLE state, in which a UE does not have an active radio connection with a base station; the RRC_CONNECTED state, in which the UE has an active radio connection with the base station; and the RRC_INACTIVE state to allow a UE to more quickly transition back to the RRC_CONNECTED state due to Radio Access Network (RAN)-level base station coordination and RAN-paging procedures. In some cases, the UE in the RRC_IDLE or RRC_INACTIVE state has only one, relatively small packet to transmit. In these cases, the UE in the RRC_IDLE or RRC_INACTIVE state can perform an early data transmission (EDT) (or a so-called small data transmission (SDT)) without transitioning to the RRC_CONNECTED state, e.g., using techniques described in 3GPP specification 36.300 v16.4.0.

According to this 3GPP specification 36.300 v16.4.0, a base station such as an eNB or ng-eNB can transmit to the UE an RRCConnectionRelease message that includes a preconfigured uplink resource (PUR) configuration, while the UE is in the RRC_CONNECTED state. The UE then can use the PUR to transmit to the base station an RRCEarlyDataRequest message containing a data packet. In another implementation, the UE can use the PUR to transmit to the base station a data packet on a Dedicated Traffic Channel (DTCH) multiplexed with an RRCConnectionResumeRequest message on a Common Control Channel (CCCH). In this case, the UE generates a MAC protocol data unit (PDU) that includes an RRCConnectionResumeRequest message and the user data packet.

However, implementing early data communication techniques (e.g., EDT) while the UE is in an inactive state (e.g., RRC_INACTIVE) or an idle state (e.g., RRC_IDLE) presents several challenges. In some scenarios, a RAN may request the UE to perform inter-frequency measurements on new radio (NR) and/or evolved universal terrestrial radio access (E-UTRA) carrier frequencies while the UE is in inactive or idle state performing early data communication. If a radio frequency (RF) receiver of the UE switches from measuring a carrier frequency (e.g., when performing early data communication) to a different carrier frequency in response to the measurement request, the RAN may inadvertently cause the UE to halt early data communication, thereby causing data interruption.

SUMMARY

A RAN and/or a UE can implement the techniques of this disclosure for managing inter-frequency measurements and early data communication while the UE is in inactive or idle state. In some implementations, the UE prioritizes early data communication when the RAN requests the UE to perform inter-frequency measurements, by suspending at least some inter-frequency measurements in response to initiating early data communication with the RAN. In some cases, the UE resumes inter-frequency measurements when the UE no longer performs early data communication with the RAN. In other implementations, the UE suspends early data communication to prioritize inter-frequency measurements. In yet other implementations, the UE concurrently performs inter-frequency measurements and early data communication. In one such implementation, the UE uses independent receivers for performing inter-frequency measurements and early data communication, respectively.

The RAN can transmit, to the UE, an indication of which frequencies the UE should measure. In some implementations, the RAN transmits this indication via system information or measurement configuration(s). In one such implementation, the RAN can enable the UE to measure (i) a limited set of frequencies (e.g., only a serving carrier frequency to perform early data communication on a serving cell of the RAN when the UE performs early data communication), or (ii) a broader set of frequencies (e.g., any carrier frequency of any cell of the RAN when the UE does not perform early data communication).

Advantageously, using the techniques of this disclosure, the RAN and/or the UE can manage inter-frequency measurements and early data communication without interrupting early data communication. When the UE later transitions from the inactive or idle state to connected state, the RAN can, based on the inter-frequency measurements received from the UE, quickly establish a radio connection with the UE when operating in dual connectivity (DC) or using carrier aggregation (CA).

BRIEF DESCRIPTION OF THE DRAWINGS

FIG. 5A is a flow diagram of an example method for managing inter-frequency measurements that includes switching to another receiver upon initiating early data communications, which can be implemented in the UE of FIG. 1A;

FIG. 6C is a flow diagram of an example method similar to the method of FIG. 6A, but with the UE prioritizing carrier frequency measurements over early data communication when the reference signal is not within the receiving bandwidth of the receiver on which the UE performs early data communication;

FIG. 6D is a flow diagram of an example method similar to the method of FIG. 6B, but with the UE prioritizing carrier frequency measurements over early data communication when the reference signal is not within the DL BWP of the receiver on which the UE performs early data communication;

FIG. 7A is a flow diagram of an example method for determining how the RAN should format an RRC message for a UE, depending on whether the RAN configures the UE to perform inter-frequency measurements or early data communication, which can be implemented in the RAN of FIG. 1A;

FIG. 7B is a flow diagram of an example method for selecting a measurement configuration for an RRC message depending on whether the RAN also configures the UE to perform early data communication, which can be implemented in the RAN of FIG. 1A;

FIG. 7C is a flow diagram of an example method for broadcasting multiple frequency measurement configurations via respective system information blocks (SIBs), for selection by the UE depending on whether the UE currently performs early data communication, which can be implemented in the RAN of FIG. 1A;

FIG. 9 is a flow diagram of an example method in which a UE determines whether it should suspend at least some inter-frequency measurements depending on whether the UE is performing early data communication, which can be implemented in the UE of FIG. 1A; and FIG. 10 is a flow diagram of an example method for managing inter-frequency measurements and early data communication, which can be implemented in the RAN of FIG. 1A.

DETAILED DESCRIPTION OF THE DRAWINGS

Figure 1A:
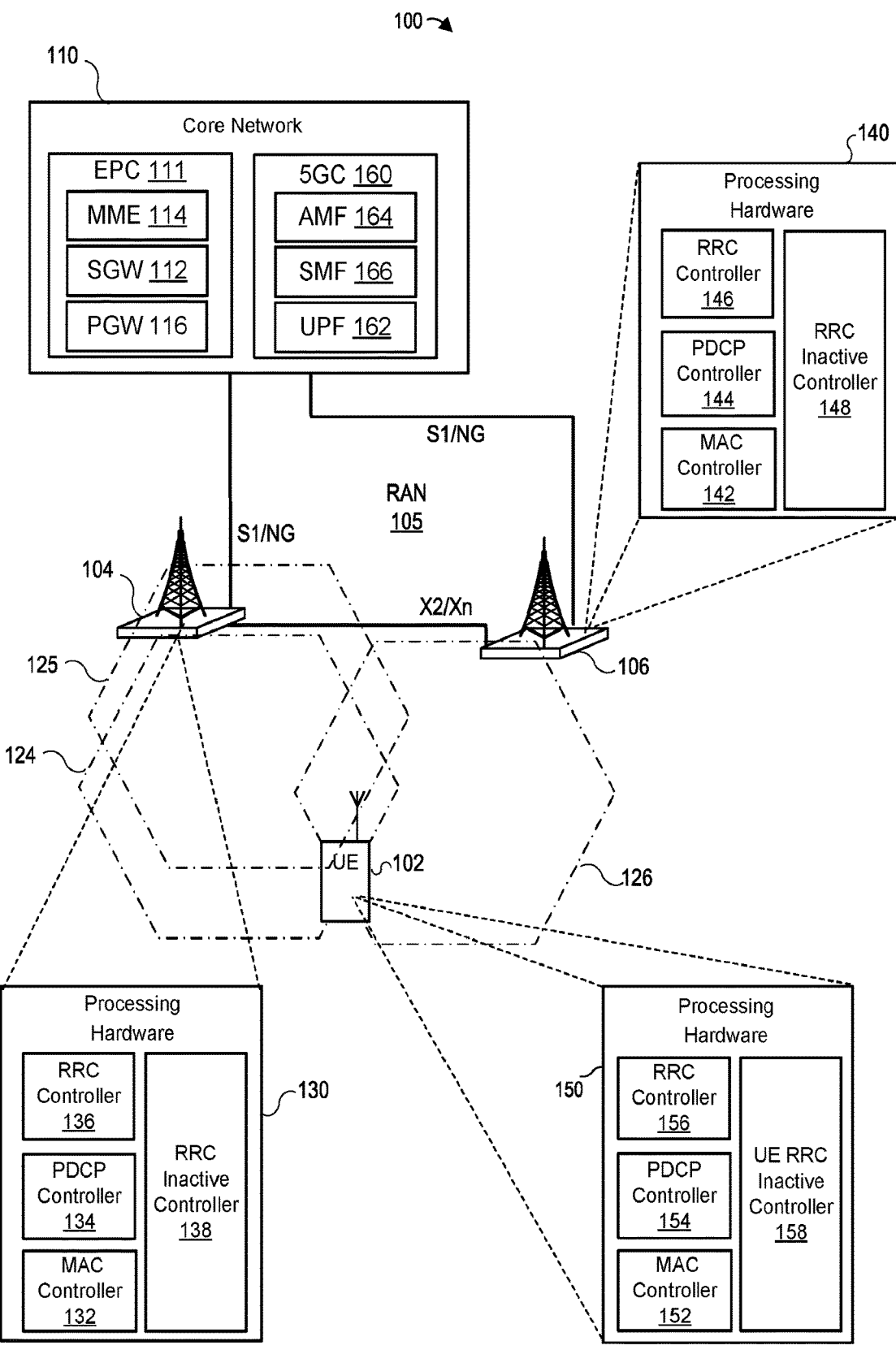
FIG. 1A is a block diagram of an example wireless communication system in which a radio access network (RAN) and/or a user equipment (UE) can implement the techniques of this disclosure for managing inter-frequency measurements.

Referring first to FIG. 1A, an example wireless communication system 100 includes a UE 102, a base station (BS) 104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core in another example.

The base station 104 can cover one or more cells (e.g., cells 124 and 125), and the base station 106 can similarly cover one or more cells (e.g., cell 126). If the base station 104 is a gNB, the cells 124 and 125 are NR cells. If the base station 104 is an (ng-)eNB, the cells 124 and 125 are evolved universal terrestrial radio access (E-UTRA) cells. Similarly, if the base station 106 is a gNB, the cell 126 is an NR cell, and if the base station 106 is an (ng-)eNB, the cell 126 is an E-UTRA cell. The cells 124, 125, and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 106 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE 102 to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports cells 124 and 125, and the base station 106 supports a cell 126. The cells 124, 125, and 126 can partially overlap, so that the UE 102 can select, reselect, or hand over from one of the cells 124, 125, and 126 to the other. To directly exchange messages or information, the base station 104 and base station 106 can support an X2 or Xn interface. In general, the CN 110 can connect to any suitable number of base stations supporting NR cells and/or EUTRA cells.

As discussed in detail below, the UE 102 can implement the techniques of this disclosure for measuring a carrier frequency as instructed by the RAN 105 without interrupting data communication when the radio connection between the UE 102 and the RAN 105 is suspended, e.g., in the inactive or idle state of the protocol for controlling radio resources between the UE 102 and the RAN 105. For clarity, the examples below refer to the RRC_INACTIVE or RRC_IDLE state of the RRC protocol.

As used in this disclosure, the term "data" or "data packet" refers to either signaling, control-plane information at a protocol layer of controlling radio resources (e.g., RRC), controlling mobility management (MM), controlling session management (SM), or to non-signaling, non-control-plane information at protocol layers above any of the protocol layers for controlling radio resources (e.g., RRC), controlling mobility management (MM), controlling session management (SM), or controlling quality of service (QoS) flows (e.g., service data adaptation protocol (SDAP)). The data to which the UE 102 and/or the RAN 105 applies the techniques of this disclosure can include for example Internet of Things (IoT) data, Ethernet traffic data, Internet traffic data, or a short message service (SMS) message. Further, the UE 102 in some implementations applies these techniques only if the size of the data is below a certain threshold value.

In the example scenarios discussed below, the UE 102 transitions to the RRC_INACTIVE or RRC_IDLE state, selects a cell of the base station 104, and exchanges data with the base station 104 either via the base station 106 or with the base station 104 directly, without transitioning to the RRC_CONNECTED state. After the UE 102 determines that data is available for UL transmission in the RRC_I-NACTIVE or RRC_IDLE state, the UE 102 can generally secure the data, include the secured data as a security-protected packet in a first UL PDU, and transmit the first UL PDU to the RAN 105 in a second UL PDU.

As a more specific example, the UE 102 can apply one or more security functions to secure-protect the UL data packet, generate a first UL PDU that includes the security-protected UL data packet, include a UL RRC message along with the first UL PDU in a second UL PDU, and transmit the second UL PDU to the RAN 105. After receiving the second UL PDU, the RAN 105 can identify the UE 102 based on a UE identity/identifier (ID) of the UE 102 that the UE 102 included in the UL RRC message. In some implementations, the UE ID can be an inactive Radio Network Temporary Identifier (I-RNTI), resume ID, or a non-access stratum (NAS) ID. The NAS ID can be an S-Temporary Mobile Subscriber Identity (S-TMSI) or a Global Unique Temporary Identifier (GUTI), in some implementations.

In some implementations, the security function that the UE 102 applied to the UL data packet as discussed above can include an integrity protection and/or encryption function. In applying integrity protection, the UE 102 can generate a message authentication code for integrity (MAC-I) to protect integrity of the data. Thus, the UE 102 in this case generates a security-protected packet that includes the data and the MAC-I. In applying an encryption function, the UE 102 can encrypt the data to obtain an encrypted packet, so that the security-protected packet includes encrypted data. When both integrity protection and encryption are applied, the UE 102 can generate a MAC-I for protecting integrity of the data and encrypt the data along with the MAC-I to generate an encrypted packet and an encrypted MAC-I. The UE 102 then can transmit the security-protected packet to the RAN 105, while still in the RRC_INACTIVE or RRC_IDLE state.

In some implementations, the data described above is a UL service data unit (SDU) of the PDCP or SDAP. The UE 102 applies the security function to the SDU and includes the secured SDU in a first UL PDU (e.g., a UL PDCP PDU). The UE 102 then includes the UL PDCP PDU in a second UL PDU such as a UL MAC PDU, which can be associated with the MAC layer. Thus, the UE 102 in these cases transmits the secured UL PDCP PDU in the UL MAC PDU. In some implementations, the UE 102 can include, in the UL MAC PDU, a UL RRC message. In other implementations, the UE 102 may not include a UL RRC message in the UL MAC PDU. In this case, the UE 102 may not include a UE ID of the UE 102 in the UL MAC PDU. In yet other implementations, the UE 102 can include the UL PDCP PDU in a UL RLC PDU and then include the UL RLC PDU in the UL MAC PDU. In implementations in which the UE 102 includes the UL RRC message in the UL MAC PDU, the UE 102 in some implementations generates an RRC MAC-I (e.g., resumeMAC-I field, as specified in 3GPP specification 38.331) and includes the RRC MAC-I in the UL RRC message. In other implementations, rather than generating the RRC MAC-I, the UE 102 can obtain the RRC MAC-I from the UL RRC message with an integrity key (e.g., $K_{RRCint}$ key), an integrity protection algorithm, and other parameters such as COUNT (e.g., 32-bit, 64-bit or 128-bit value), BEARER (e.g., 5-bit value), and DIRECTION (e.g., 1-bit value).

In other implementations, the data described above is a UL SDU of the NAS. The UE 102 applies the security function to the SDU and includes the secured SDU in a first UL PDU such as a UL NAS PDU, which can be associated with the NAS layer. For example, the NAS layer can be an MM or SM sublayer of 5G, evolved packet system (EPS), or 6G. Then the UE 102 can include the UL NAS PDU in a second UL PDU such as a UL RRC message. Thus, the UE 102 in these cases transmits the (first) secured UL NAS PDU in the UL RRC message. In some implementations, the UE 102 can include the UL RRC message in a UL MAC PDU and transmits the UL MAC PDU to a base station (e.g., base station 104 or 106) via a cell (e.g., cell 124 or 126). The UE 102 may not include an RRC MAC-I in the UL RRC message, or alternatively, include an RRC MAC-I as described above.

In some implementations, the UL RRC message described above can be a common control channel (CCCH) message, an RRC resume request message, or an RRC early data request message. The RRC resume request message can be an existing RRC resume request message (e.g., an RRCResumeRequest message, an RRCResumeRequest1 message, an RRCConnectionResumeRequest message, or an RRCConnectionResumeRequest1 message), or a new RRC resume request message, similar to the existing RRC resume request message, but defined as a format of a RRC release or version later than that of the existing RRC resume request message. In some implementations, the UL RRC message can include a UE ID of the UE 102 as described above.

In some scenarios and implementations in which the UE ID of the UE 102 is included in the UL RRC message as described above, the base station 106 can retrieve the UE ID of the UE 102 from the UL RRC message and identify, based to the determined UE ID, the base station 104 as the destination of the data in the first UL PDU. In one implementation, the base station 106 retrieves the first UL PDU from the second UL PDU and transmits the first UL PDU to the base station 104. The base station 104 then retrieves the security-protected packet from the first UL PDU, applies security function(s) to decrypt the data and/or check the integrity protection, and transmits the data to the CN 110 (e.g., SGW 112, UPF 162, MME 114, or AMF 164) or an edge server. In some implementations, the edge server can operate within the RAN 105. More specifically, the base station 104 derives security key(s) from UE context information of the UE 102. Then the base station 104 retrieves the data from the security-protected packet by using the security key(s) and transmits the data to the CN 110 or edge server. In another implementation, instead of the base station 104 retrieving the security-protected packet from the first UL PDU, the base station 106 retrieves the security-protected packet from the first UL PDU. More specifically, the base station 106 can perform a retrieve UE context procedure with the base station 104 to obtain UE context information of the UE 102 from the base station 104, and then derive security key(s) from the UE context information. Then the base station 106 retrieves the data from the security-protected packet by using the security key(s) and transmits the data to the CN 110 (e.g., UPF 162) or an edge server. In each of these implementations, when the security-protected packet is an encrypted packet, the base station 104 or 106 decrypts the encrypted packet to obtain the data by using the security key(s) (e.g., an (de-)encryption key). If the security-protected packet is an integrity-protected packet that includes the data and the MAC-I, the base station 104 or 106 can verify whether the MAC-I is valid for the security-protected packet by using the security key(s) (e.g., an integrity key). When the base station 104 or 106 confirms that the MAC-I is valid, the base station 104 or 106 sends the data to the CN 110 or edge server. On the other hand, when the base station 104 or 106 determines the MAC-I is invalid, the base station 104 or 106 discards the security-protected packet. Further, if the security-protected packet is both encrypted and integrity-protected and therefore includes the encrypted packet along with the encrypted MAC-I, the base station 104 or 106 decrypts the encrypted packet and the encrypted MAC-I to obtain the data and the MAC-I. The base station 104 or 106 then determines whether the MAC-I is valid for the data. If the base station 104 or 106 determines that the MAC-I is valid, the base station 104 or 106 retrieves the data and forwards the data to the CN 110 or edge server. However, if the base station 104 or 106 determines that the MAC-I is invalid, the base station 104 or 106 discards the packet.

In other scenarios and implementations, the base station 104 can retrieve and use the UE ID of the UE 102 from the UL RRC message to determine that the base station 104 stores UE context information of the UE 102. Accordingly, the base station 104 retrieves the security-protected packet from the first UL PDU, retrieves the data from the security-protected packet, and sends the data to the CN 110 or edge server as described above.

Further, in some scenarios and implementations, the RAN 105 transmits data in the downlink (DL) direction to the UE 102 operating in the RRC_INACTIVE or RRC_IDLE state. In one implementation, when the base station 104 determines that data is available for DL transmission to the UE 102 currently operating in the RRC_INACTIVE or RRC_IDLE state, the base station 104 can secure the data to generate a security-protected packet, generate a first DL PDU that includes the security-protected packet, and include the first DL PDU in a second DL PDU. To secure the data, the base station 104 can apply security function(s) (e.g., integrity protection and/or encryption) to the data. More particularly, similar to the manner in which the UE 102 can secure data available for UL transmission, in applying integrity protection, the base station 104 can generate a MAC-I for protecting integrity of the data available for DL transmission, so that security-protected packet includes the DL data and the MAC-I. In applying an encryption function, the base station 104 can encrypt the data to generate an encrypted packet, so that the security-protected packet includes encrypted data. Further, when both integrity protection and encryption are applied, the base station 104 can generate a MAC-I for protecting integrity of the data and encrypt the data along with the MAC-I to generate an encrypted packet and an encrypted MAC-I.

In some implementations, the base station 104 generates a first DL PDU (e.g., a DL PDCP PDU) using the security-protected packet, includes the first DL PDU in a second DL PDU (e.g., a DL MAC PDU associated with the MAC layer), and transmits the second DL PDU to the UE 102 without causing the UE 102 to transition to the RRC_CONNECTED state. In some implementations, the base station 104 includes the DL PDCP PDU in a DL RLC PDU, and further includes the DL RLC PDU in the DL MAC PDU.

In another implementation, the base station 104 transmits the first DL PDU to the base station 106, which then generates a second DL PDU (e.g., a DL MAC PDU) that includes the first DL PDU and transmits the second DL PDU to the UE 102 without causing the UE 102 to transition to the RRC_CONNECTED state. In some implementations, the base station 106 generates a DL RLC PDU that includes the first DL PDU and includes the DL RLC PDU in the second DL PDU. In yet another implementation, the base station 104 includes the first DL PDU in a DL RLC PDU and transmits the DL RLC PDU to the base station 106, which in turn generates a second DL PDU (e.g., a DL MAC PDU) that includes the DL RLC PDU and transmits the second DL PDU to the UE 102.

In some implementations, the base station 104 or 106 generates a downlink control information (DCI) and a cyclic redundancy check (CRC) scrambled with an ID of the UE 102 to transmit the second DL PDU generated by the base station 104 or 106. In some implementations, the ID of the UE 102 can be a Radio Network Temporary Identifier (RNTI), such as a cell RNTI (C-RNTI), a temporary C-RNTI, or an inactive C-RNTI. The base station 104 or 106 can transmit the DCI and scrambled CRC on a physical downlink control channel (PDCCH) to the UE 102 operating in the RRC_INACTIVE or RRC_IDLE state. In some implementations, the base station 104 or 106 may assign the ID of the UE 102 to the UE 102 in a random access response that the base station 104 or 106 transmits in a random access procedure with the UE 102 before transmitting the DCI and scrambled CRC. In other implementations, the base station 104 or 106 may assign the ID of the UE 102 to the UE 102 in an RRC message (e.g., RRC release message or an RRC reconfiguration message) that the base station 104 or 106 transmits to the UE 102 before transmitting the DCI and scrambled CRC.

After receiving the DCI and scrambled CRC on the PDCCH, the UE 102 can confirm that a physical downlink shared channel (PDSCH), including the second DL PDU, is addressed to the UE 102 according to the ID of the UE 102, DCI, and the scrambled CRC. The UE 102 then can retrieve the data from the security-protected packet. If the security-protected packet is an encrypted packet, the UE 102 can decrypt the encrypted packet using the appropriate decryption function and the security key to obtain the data. If the security-protected packet is the integrity-protected packet (i.e., that includes the data and the MAC-I), the UE 102 can determine whether the MAC-I is valid. If the UE 102 confirms that the MAC-I is valid, the UE 102 retrieves the data; otherwise, the UE 102 discards the data. If the security-protected packet is both encrypted and integrity-protected (i.e., that includes encrypted data and an encrypted MAC-I), the UE 102 can decrypt both the encrypted packet and encrypted MAC-I to obtain the data and the MAC-I. The UE 102 then can verify whether the MAC-I is valid for the data. If the UE 102 confirms that the MAC-I is valid, the UE 102 retrieves and processes the data; otherwise, the UE 102 discards the data.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a MAC controller 132 configured to perform a random access procedure with one or more user devices (e.g., UE 102), receive UL MAC PDUs from the one or more user devices, and transmit DL MAC PDUs to the one or more user devices. The processing hardware 130 can also include a PDCP controller 134 configured to transmit and/or receive PDCP PDUs in accordance with the manner in which the base station 104 can transmit and/or receive DL and/or UL data, respectively. The processing hardware 130 can further include an RRC controller 136 to implement procedures and messaging at the RRC sublayer of the protocol communication stack. The processing hardware 130 in an example implementation includes an RRC inactive controller 138 configured to manage UL and/or DL communications with the one or more UEs operating in the RRC_INACTIVE or RRC_IDLE state. The base station 106 can include processing hardware 140 that is similar to processing hardware 130. In particular, components 142, 144, 146, and 148 can be similar to the components 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC inactive controller 158 configured to manage UL and/or DL communications when the UE 102 operates in the RRC_INACTIVE or RRC_IDLE state. The processing hardware 150 in an example implementation includes a MAC controller 152 configured to perform a random access procedure with base station 104 or 106, transmit UL MAC PDUs to the base station 104 or 106, and receive DL MAC PDUs from the base station 104 or 106. The processing hardware 150 can also include a PDCP controller 154 configured to transmit and/or receive PDCP PDUs in accordance with the manner in which the UE 102 can transmit and/or receive data in the UL and/or DL direction. The processing hardware 150 can further include an RRC controller 156 to implement procedures and messaging at the RRC sublayer of the protocol communication stack.

Figure 1B:
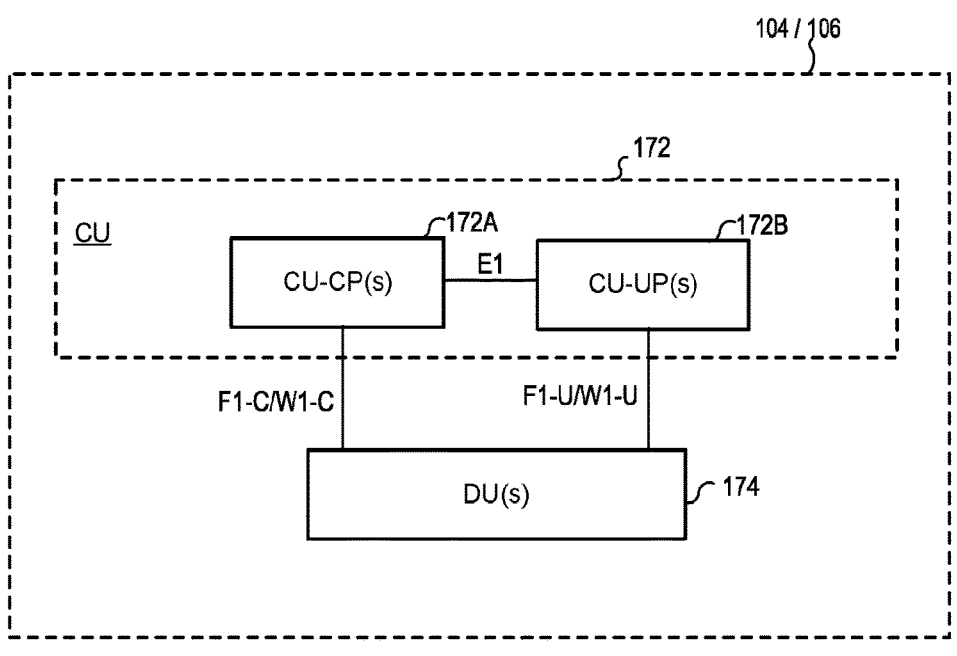
FIG. 1B is a block diagram of an example base station including a central unit (CU) and a distributed unit (DU) that can operate in the RAN of FIG. 1A.

FIG. 1B depicts an example distributed or disaggregated implementation of any one or more of the base stations 104, 106. In this implementation, each of the base station 104 and/or 106 includes a central unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller (e.g., PDCP controller 134, 144), an RRC controller (e.g., RRC controller 136, 146), and/or an RRC inactive controller (e.g., RRC inactive controller 138, 148). In some implementations, the CU 172 can include an RLC controller configured to manage or control one or more RLC operations or procedures. In other implementations, the CU 172 does not include an RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or an RLC controller configured to manage or control one or more RLC operations or procedures. The processing hardware can also include a physical layer controller configured to manage or control one or more physical layer operations or procedures.

In some implementations, the RAN 105 supports Integrated Access and Backhaul (IAB) functionality. In some implementations, the DU 174 operates as an (IAB)-node, and the CU 172 operates as an IAB-donor.

In some implementations, the CU 172 can include a logical node CU-CP 172A that hosts the control plane part of the PDCP protocol of the CU 172. The CU 172 can also include logical node(s) CU-UP 172B that hosts the user plane part of the PDCP protocol and/or SDAP protocol of the CU 172. The CU-CP 172A can transmit control information (e.g., RRC messages, F1 application protocol messages), and the CU-UP 172B can transmit data packets (e.g., SDAP PDUs or IP packets).

The CU-CP 172A can be connected to multiple CU-UPs 172B through the E1 interface. The CU-CP 172A selects the appropriate CU-UP 172B for the requested services for the UE 102. In some implementations, a single CU-UP 172B can be connected to multiple CU-CPs 172A through the E1 interface. If the CU-CP 172A and DU(s) 174 belong to a gNB, the CU-CP 172A can be connected to one or more DU 174s through an F1-C interface and/or an F1-U interface. If the CU-CP 172A and DU(s) 174 belong to an ng-eNB, the CU-CP 172A can be connected to DU(s) 174 through a W1-C interface and/or a W1-U interface. In some implementations, one DU 174 can be connected to multiple CU-UPs 172B under the control of the same CU-CP 172A. In such implementations, the connectivity between a CU-UP 172B and a DU 174 is established by the CU-CP 172A using Bearer Context Management functions.

Figure 2A:
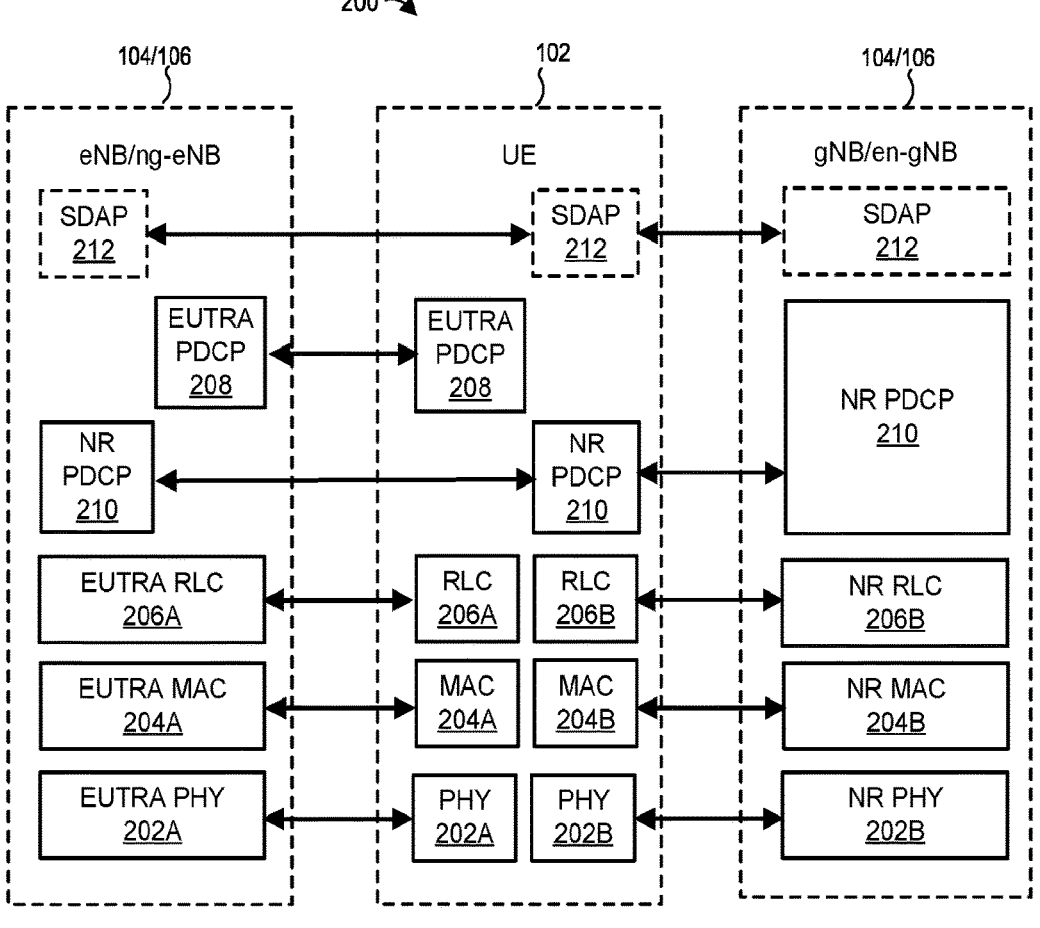
FIG. 2A is a block diagram of an example protocol stack according to which the UE of FIG. 1A can communicate with the RAN of FIG. 1A.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to a EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to the SDAP sublayer 212 or an RRC sublayer (not shown in FIG. 2A). The UE 102, in some implementations, supports both the EUTRA and the NR stack as shown in FIG. 2A, to support handover between EUTRA and NR base stations and/or to support dual connectivity (DC) over EUTRA and NR interfaces. Further, as illustrated in FIG. 2A, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an IP layer, layered directly or indirectly over the PDCP layer 208 or 210) that can be referred to as SDUs, and output packets (e.g., to the RLC layer 206A or 206B) that can be referred to as PDUs. Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) to the RRC sublayer (not shown in FIG. 2A) to exchange RRC messages or NAS messages, for example. On a user plane, the EUTRA PDCP sublayer 208 and the NR PDCP sublayer 210 can provide data radio bearers (DRBs) to support data exchange. Data exchanged on the NR PDCP sublayer 210 can be SDAP PDUs, IP packets, or Ethernet packets.

Figure 2B:
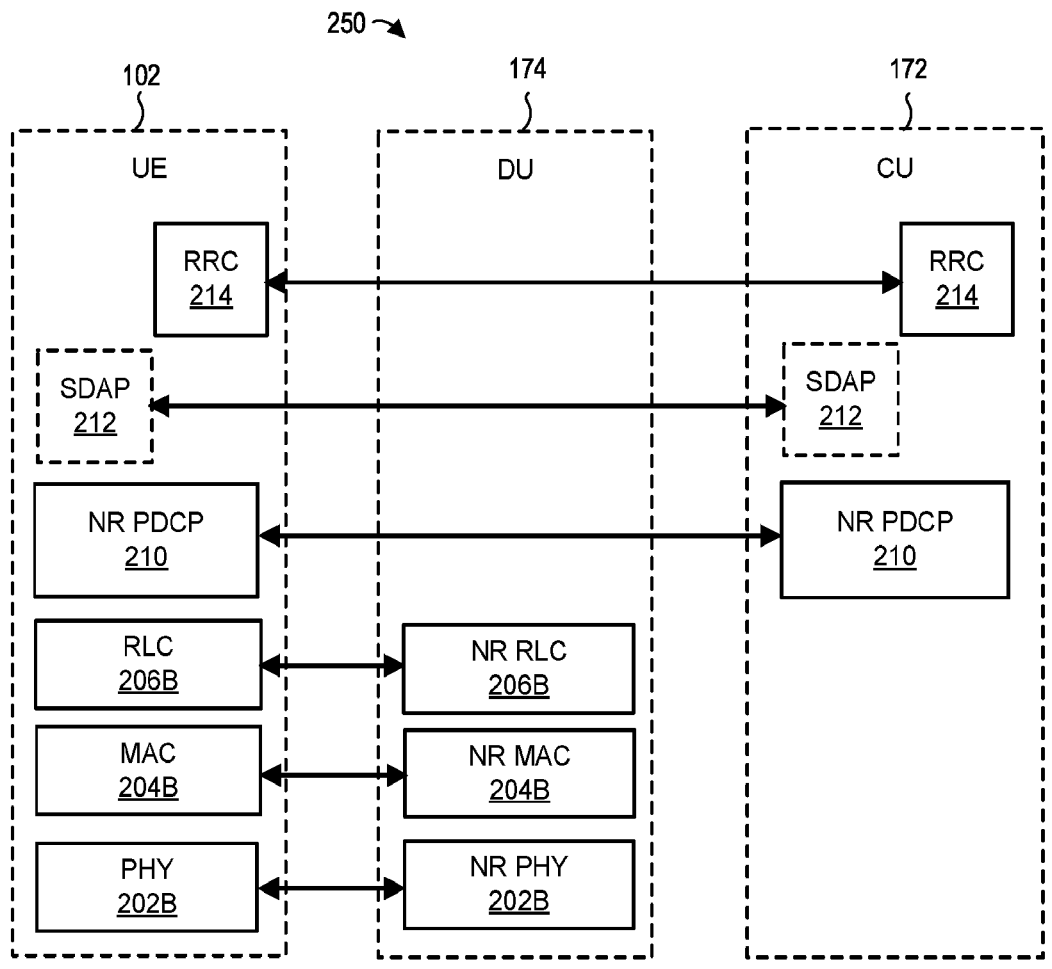
FIG. 2B is a block diagram of an example protocol stack according to which the UE of FIGS. 1A-B can communicate with a DU and a CU.

Thus, it is possible to functionally split the radio protocol stack, as shown by the radio protocol stack 250 in FIG. 2B. The CU at any of the base stations 104 or 106 can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU. To support connection to a 5GC, NR PDCP 210 provides SRBs to RRC 214, and NR PDCP 210 provides DRBs to SDAP 212 and SRBs to RRC 214.

Next, several example scenarios that involve several components of FIG. 1A and relate to managing inter-frequency measurements and EDT while the UE 102 is in inactive or idle state are discussed next with reference to FIGS. 3A-3D. Generally speaking, events in FIGS. 3A-3D that are the same are labeled with the same reference numbers. To simplify the following description, the "inactive state" is used to represent either the inactive (e.g., RRC_INACTIVE) or idle (e.g., RRC_IDLE) state, unless otherwise noted.

Figure 3A:
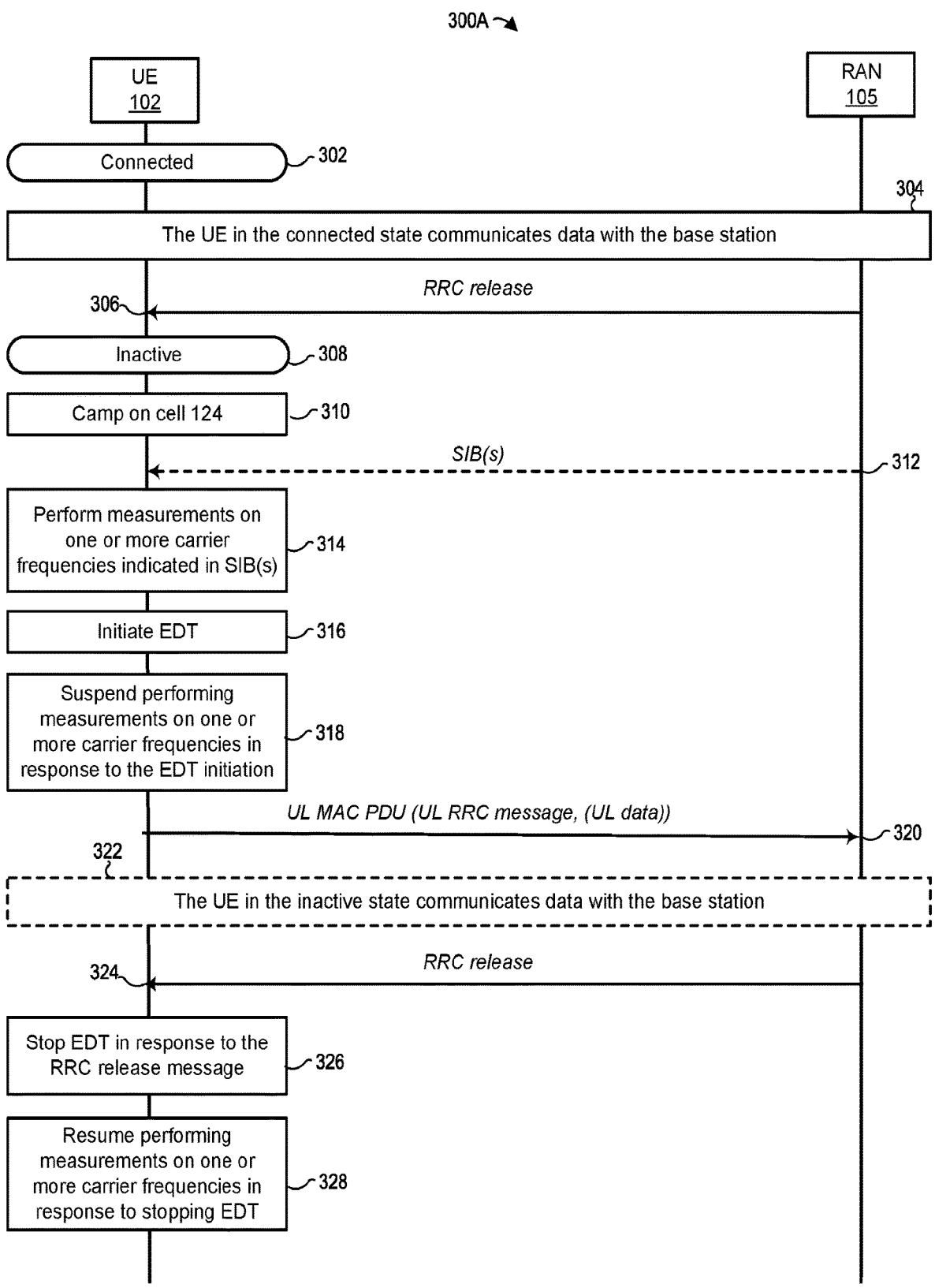
FIG. 3A is an example message sequence in which a UE suspends measurements on one or more carrier frequencies in response to initiating early data communication with a RAN, and resumes the measurements upon completing the early data communication.

Referring first to FIG. 3A, in a scenario 300A, the UE 102 initially operates 302 in a connected (e.g., RRC_CON-NECTED) state and communicates 304 data with the RAN 105 (e.g., base station 104 and/or base station 106), e.g., via one or more radio bearers (RBs). In some implementations, the UE 102 in the connected state communicates 304 control-plane (CP) data with the RAN 105 via one or more signaling RBs (SRBs). In such implementations, the CP data includes RRC PDUs that includes RRC messages, NAS messages, IP packets, Ethernet packets, and/or application packets. In other implementations, the UE 102 in the connected state communicates 304 user-plane (UP) data with the RAN 105 via one or more data RBs (DRBs). The UP data in some example scenarios includes IP packets, Ethernet packets, and/or application packets.

After a certain period of data inactivity, the RAN 105 can determine that neither the RAN 105 nor the UE 102 has transmitted any data in the downlink direction or the uplink direction, respectively, during the certain period. In response to the determination, the RAN 105 can transmit 306 a first DL RRC message to the UE 102 to instruct the UE 102 to transition to the inactive state. In some implementations, the first DL RRC message can be a first RRC release message (e.g., RRCRelease message or RRCConnectionRelease message). In some implementations, the RAN 105 can assign an I-RNTI or a resume ID to the UE 102 and include the assigned value in the first RRC release message.

In some implementations, the RAN 105 includes an early data transmission (EDT) configuration in the first RRC release message to enable the UE 102 to perform EDT upon receiving the first RRC release message. The RAN 105 in some implementations can indicate RBs as EDT RB(s) (i.e., the RB(s) are suitable or configured for EDT) or non-EDT RB(s) (i.e., the RB(s) are unsuitable or not configured for EDT). For example, the RAN 105 can include an EDT indication in the first RRC release message to indicate a first SRB as an EDT RB. In cases where the RAN 105 does not include an EDT indication for a second SRB in the first RRC release message, the second SRB is a non-EDT RB by default.

Alternatively, the RAN 105 can include a non-EDT indication in the first RRC release message to indicate the second SRB as a non-EDT RB. In another similar example, the RAN 105 can include an EDT indication in the first RRC release message to indicate a first DRB as an EDT RB. In cases that the RAN 105 does not include an EDT indication for a second DRB in the first RRC release message, the second DRB is a non-EDT DRB by default. Alternatively, the RAN 105 can include a non-EDT indication in the first RRC release message to indicate the second DRB as a non-EDT RB. In other implementations, particular RB(s) (e.g., SRB0, SRB1, and/or SRB2) can be considered EDT RB(s) by default, even though the RAN 105 does not indicate that the particular RB(s) are EDT RB(s) in the first RRC release message. In such implementations, the UE 102 determines the particular RB(s) as EDT RB(s) as a default, even though the UE 102 does not receive from the RAN 105 indication(s) that identify the particular RB(s) as EDT RB(s).

The EDT configuration can include one or more EDT initiation criteria configurations, a configured grant (CG) configuration, multiple CG configurations, a configuration of HARQ retransmission with the CG configuration(s), a subsequent EDT configuration, a repetition configuration, a PDCCH configuration, a PUCCH configuration, and/or PUSCH configuration.

For example, the EDT initiation criteria configuration(s) can include a signal strength threshold (e.g., reference signal received power (RSRP) threshold, reference signal received quality (RSRQ) threshold, signal to noise and interference ratio (SINR) threshold, and/or other suitable metrics), a maximum data volume size, a maximum packet size, and/or a maximum number of packets for an EDT session. In accordance with the EDT initiation criteria configuration(s), in some implementations, the UE 102 can perform EDT (i.e., initial EDT and/or subsequent EDT) only if a signal strength obtained by the UE 102 from measurements is above the signal strength threshold specified by the EDT initiation criteria configuration(s). In some implementations, the maximum data volume size specifies a maximum number of octets for all EDT RB(s) (i.e., the RB(s) suitable or configured for EDT) that the UE 102 can transmit in an EDT session. In some implementations, the maximum packet size specifies a maximum number of octets that the UE 102 can transmit in a single EDT (i.e., an uplink MAC PDU). In other implementations, the maximum packet size specifies a maximum number of octets for a single packet that the UE 102 can transmit. The single packet can be an application data packet (e.g., IP packet or Ethernet packet), a SDAP PDU, a NAS PDU, a RRC PDU, a PDCP SDU, a PDCP PDU, or a RLC PDU.

As another example, each, or at least some, of the CG configurations(s) can include a time domain resources allocation configuration, a frequency domain resources allocation configuration, a hybrid automatic repeat request (HARQ) configuration, one or more EDT initiation criteria configurations, a repetition configuration, a PDCCH configuration, a PUCCH configuration, a PUSCH configuration, a configuration of HARQ retransmission, a frequency hopping configuration, and/or a physical layer acknowledgement configuration, which are specific for EDT using radio resources configured by the CG configuration(s). In other implementations, each, or at least some, of the CG configuration(s) can include configuration parameters similar to configuration parameters included in a ConfiguredGrant-Configuration IE specified in 3GPP specification 38.331.

The subsequent EDT configuration described above enables the UE 102 to transmit subsequent UL data in an EDT session. In cases where the RAN 105 does not provide the UE 102 with the subsequent EDT configuration, the UE 102 is consequently disabled from transmitting subsequent UL data in an EDT session. In some implementations, the repetition configuration enables or configures the UE 102 to transmit repetitions of a UL transmission (e.g., a PUSCH transmission or a UL MAC PDU) in an EDT session. In cases where the RAN 105 does not provide the UE 102 with the repetition configuration, the UE 102 is consequently disabled from transmitting repetitions for a UL transmission in an EDT session.

Referring back to event 306, in response to or upon receiving the first RRC release message, the UE 102 transitions 308 to the inactive state. In some implementations in which either the base station 104 or base station 106 of the RAN 105 is a distributed or disaggregated base station including a CU 172 and DU 174 as described in FIG. 1B, after the UE 102 transitions to the inactive state, the UE 102 can perform one or more RAN notification area (RNA) updates with the CU 172 via the DU 174 without state transitions (e.g., without transitioning from the inactive state back to the connected state).

After the UE 102 transitions 308 to the inactive state, the UE 102 camps 310 (e.g., selects or reselects) on cell 124. In some implementations, the RAN 105 can send a request via system information (e.g., SIB(s)) to the UE 102, for the UE 102 to measure one or more carrier frequencies (e.g., NR carriers, E-UTRA carriers) while the UE 102 operates in the inactive state. In turn, the UE 102 can receive 312 system information block(s) (SIB(s)) on the cell 124. Although scenario 300A illustrates the UE 102 receiving 312 the SIB(s) after the UE 102 transitions into the inactive state at event 308, in other scenarios and implementations, the UE 102 can receive the SIB(s) before receiving 306 the first RRC release message. The SIB(s) include information of one or more carrier frequencies for cell re-selection, idle measurements, and/or inactive measurements.

After or in response to receiving 312 the SIB(s), the UE 102, while still in the inactive state, performs 314 measurements on the one or more carrier frequencies indicated in the SIB(s).

In some implementations, the SIB(s) include SIB4, SIB5 and/or SIB11 if the cell 124 is an NR cell. For example, the SIB4 can contain information relevant for inter-frequency cell re-selection (i.e., information about other NR carrier frequencies and inter-frequency neighboring cells relevant for cell re-selection), which can also be used for NR idle/inactive measurements. The SIB4 can also include cell re-selection parameters common for a frequency as well as cell specific re-selection parameters. In another example, the SIB5 can contain information relevant only for inter-RAT cell re-selection, i.e., information about E-UTRA carrier frequencies and E-UTRA neighboring cells relevant for cell re-selection. The SIB5 can also include cell re-selection parameters common for a frequency. In yet another example, the SIB11 can contain NR carrier frequencies for idle/inactive measurements.

In other implementations, the SIB(s) include SystemInformationBlockType5 and/or SystemInformationBlockType24 if the cell 124 is an E-UTRA cell. For example, the SystemInformationBlockType5 can contain information about other E-UTRA frequencies and inter-frequency neighboring cells relevant for cell re-selection (including cell re-selection parameters common for a frequency as well as cell specific re-selection parameters). The SystemInformationBlockType5 can also contain information about E-UTRA and NR idle/inactive measurements. In another example, the SystemInformationBlockType24 can contain information relevant for inter-RAT cell re-selection (i.e., information about NR frequencies and NR neighboring cells relevant for cell re-selection), which can also be used for NR idle/inactive measurements. The SystemInformationBlockType24 can include cell re-selection parameters common for a frequency.

At a later time, the UE 102 in the inactive state initiates 316 EDT (e.g., in accordance with the EDT configuration received in event 306) to transmit UL data or receive DL data. In cases of transmitting UL data while the UE 102 is in the inactive state, the EDT is referred to as mobile originating (MO) EDT. In cases of receiving DL data while the UE 102 is in the inactive state, the EDT is referred to as mobile terminating (MT) EDT (i.e., early data reception from the viewpoint of the UE 102). In such cases, the UE 102 at event 316 receives from the RAN 105 a paging message, which includes a UE ID of the UE 102 and an EDT indication. The UE ID can be an I-RNTI, resume ID, or a NAS ID (e.g., S-TMSI or 5G-S-TMSI). In response to the paging message (i.e., the UE ID and the EDT indication), the UE 102 initiates EDT.

In some implementations, the UE 102 can perform EDT only if a signal strength obtained by the UE 102 from measuring a serving carrier frequency of the cell 124 exceeds a signal strength threshold specified by the EDT initiation criteria configuration(s). If the signal strength exceeds the signal strength threshold, the UE 102 can begin performing EDT via the cell 124.

In some implementations, the UE 102 can determine whether the UL data for transmission during EDT qualifies for transmission in the inactive state in view of one or more factors, such as whether the UL data is an IMS packet, whether the UL data is associated with a radio bearer (e.g., DRB or SRB) not suitable or configured for EDT, whether the UL data is an NAS message for initiating a particular NAS procedure, the size of the data, etc. If the UE 102 determines that the UL data does not qualify for transmission in the inactive state, the UE 102 can perform an RRC procedure (e.g., RRC connection establishment procedure or RRC resume procedure) to transition to the connected state.

In response to or after initiating 316 EDT, the UE 102 suspends 318 performing measurements on one or more carrier frequencies initially started at event 314. That is, while the UE 102 suspends 318 performing measurements on one or more carrier frequencies where measurements were previously performed 315, the UE 102 refrains from measuring on those carrier frequencies. Advantageously, and particularly if the UE 102 is not capable of concurrently measuring a carrier frequency and performing EDT, the UE 102 can prevent an interruption to the EDT with the RAN 105 by suspending performance of the measurements. As will be described further below, after the UE 102 stops or otherwise completes performing EDT, the UE 102 can resume performance of the measurements, in some implementations. As such, the UE 102 can still perform inter-frequency measurements as instructed by the RAN 105 without interrupting EDT.

During event 318, as an example of MO EDT the UE 102 can generate an initial UL MAC PDU including a UL RRC message, and transmit 320 the initial UL MAC PDU to RAN 105 on cell 124. In cases of MO EDT, the UE 102 can include UL data in the initial UL MAC PDU, and the RAN 105 retrieves the UL data from the initial UL MAC PDU. In cases of MT EDT, the UE 102 does not include UL data in the initial UL MAC PDU. The UL RRC message can be a CCCH message, an RRC resume request message, or an RRC early data request message, as described above in reference to FIG. 1A. In some implementations, the UL RRC message can include an EDT indication which can be a field or information element (IE) (e.g., resumeCause or Resume-Cause).

In some implementations, to transmit the initial UL MAC PDU at event 320, the UE 102 in the inactive state performs a random access procedure with the RAN 105. For example, the random access procedure can be a four-step random access procedure or a two-step random access procedure. In the case of the four-step random access procedure, the UE

102 transmits a random access preamble to the RAN 105, the RAN 105 in response transmits to the UE 102 a random access response (RAR) including an uplink grant, and the UE 102 transmits 320 the UL MAC PDU in accordance with the uplink grant. The RAN 105 receives 320 the UL MAC PDU in accordance with the uplink grant in the RAR. In the case of the two-step random access procedure, the UE 102 transmits 320 to the RAN 105 a message A including a random access preamble and the UL MAC PDU in accordance with two-step random access configuration parameters. The UE 102 can receive the two-step random access configuration parameters in system information broadcast by the RAN 105 on cell 124 before transmitting 320 the UL MAC PDU. The RAN 105 receives 320 the UL MAC PDU in accordance with the two-step random access configuration parameters. In further implementations, the UE 102 can transmit 320 the UL MAC PDU on radio resources configured in configured grant (CG) configuration(s). The RAN 105 can include the CG configuration to the UE 102 in the first RRC release message, as described above. Thus, the RAN 105 receives 320 the UL MAC PDU on the radio resources.

After receiving 320 the UL RRC message and/or the UL data, the RAN 105 refrains from transitioning the UE 102 to a connected state and communicates 322 data (i.e., UL data and/or DL data) with the UE 102 operating in the inactive state. In some implementations, the UE 102 can transmit 322 UL MAC PDU(s) on radio resources configured in the CG configuration(s) described above. In some implementations, the data at event 320 or 322 can include at least one data packet for an application or a protocol layer, such as an MM layer (e.g., 5G MM), an SM layer (e.g., 5G SM), an LTE positioning protocol (LPP) layer, or a secure user-plane location (SUPL) protocol layer. The data packet can be an IP packet, an Ethernet packet, an application packet. In other implementations, the data packet can be a PDCP PDU that includes an RRC PDU, a MM PDU, a SM PDU, LPP PDU, an IP packet, an Ethernet packet, or an application packet. In yet other implementations, the data packet can be an RRC PDU including a NAS PDU, such that the NAD PDU includes an IP packet, an Ethernet packet, or an application packet. At event 322, the UE 102 can transmit to the RAN 105 one or more UL MAC PDUs, and/or the RAN 105 can transmit to the UE 102 one or more DL MAC PDUs, where each of the UL MAC PDU(s) and/or DL MAC PDU(s) can include a particular data packet or a particular segment of a data packet.

Generally, when the RAN 105 receives all segments of a data packet from the UE 102, the RAN 105 assembles the segments to obtain the data packet and can process the data packet or send the data packet to the CN 110. In some implementations, the UL data at event 320 can be a segment of a particular data packet for an application or a protocol layer. In such implementations, the UE 102 at event 322 can transmit other segment(s) of the particular data packet to the RAN 105, until all segments of the data packet are transmitted to the RAN 105. Similarly, when the UE 102 receives all segments of a data packet from the RAN 105, the UE 102 assembles the segments to obtain the data packet.

After a (second) certain period of data inactivity for the UE 102, the RAN 105 can determine that neither the RAN 105 nor the UE 102 has transmitted any data in the downlink direction or the uplink direction after events 320 and/or 322, respectively, during the (second) certain period. In response to the determination, the RAN 105 can send 324 a second DL RRC message (e.g., a second RRC release message) to the UE 102, similar to event 306. In response to the second RRC release message, the UE 102 remains in the inactive state and stops 326 EDT. The UE 102 resumes 328 performing measurements on one or more carrier frequencies in response to stopping 326 EDT in some implementations.

In some implementations, the UE 102 performs 314, 328 measurements on one or more carrier frequencies in accordance with 3GPP specifications 38.331, 38.133, and/or 38.304. In other implementations, the UE 102 performs 314, 328 measurements on one or more carrier frequencies in accordance with 3GPP specifications 36.331, 36.133 and/or 36.304.

Figure 3B:
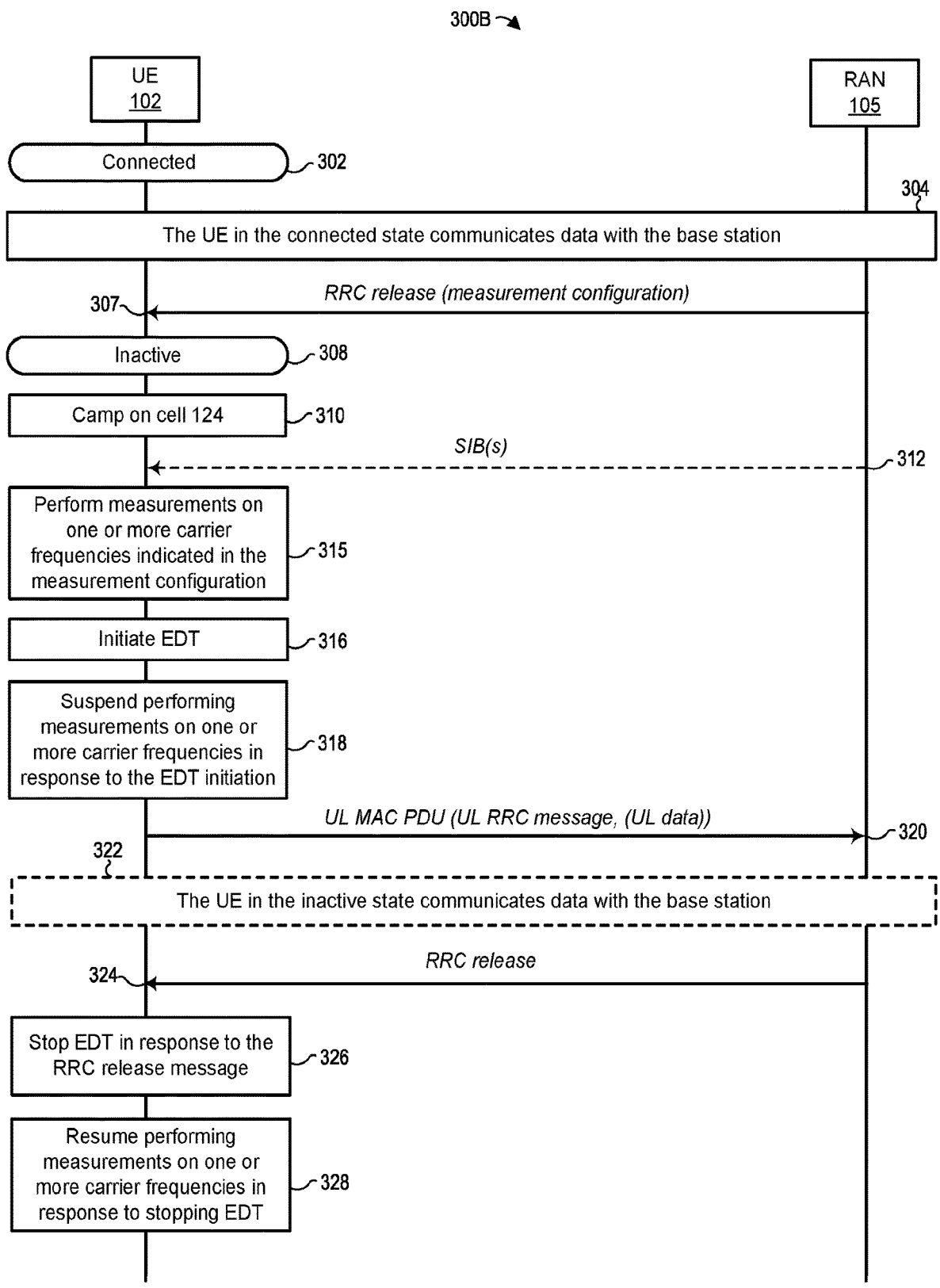
FIG. 3B is an example message sequence similar to the message sequence of FIG. 3A, but with the RAN indicating frequencies for inter-frequency measurement in a release message rather than in a system information block.

Turning to FIG. 3B, a scenario 300B is similar to scenario 300A, except that whereas the UE 102 in scenario 300A performs 314 measurements on one or more carrier frequencies indicated in SIB(s), the UE 102 in scenario 300B performs 315 measurements on one or more carrier frequencies indicated in a release message received from the RAN 105. That is, the RAN 105 can send, to the UE 102, a release message indicating the one or more carrier frequencies (e.g., NR carriers, E-UTRA carriers) for the UE 102 to measure while the UE 102 operates in the inactive state. In some implementations, the UE 102 can receive 307 a measurement configuration (e.g., CellReselectionPriorities or MeasIdleConfigDedicated-r16) included in a DL RRC message (e.g., RRC release message) from the RAN 105. Similar to event 306 of scenario 300A, the RAN 105 can transmit 307 this DL RRC message to the UE 102 to also instruct the UE 102 to transition to the inactive state at event 308.

Figure 3C:
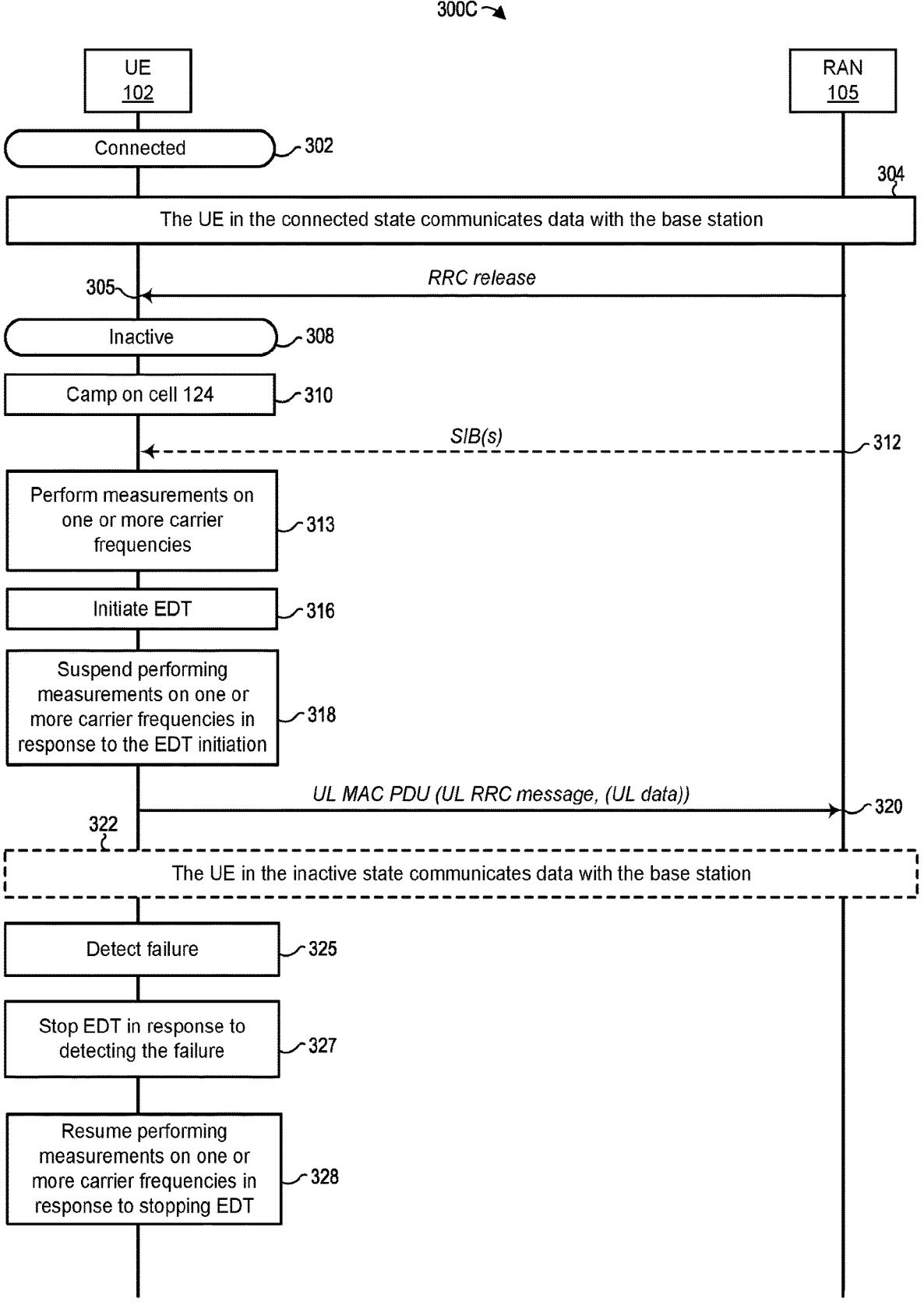
FIG. 3C is an example message sequence similar to the message sequence of FIG. 3A, but with the UE resuming measurements in response to detecting a failure during early data communication.

Turning to FIG. 3C, a scenario 300C is similar to scenarios 300A and 300B, except that whereas the UE 102 in scenarios 300A and 300B stops 326 EDT in response to receiving 324 a DL RRC message (e.g., a second RRC release message) from the RAN 105, the UE 102 in scenario 300C stops 327 EDT in response to detecting 325 failure during EDT.

In scenario 300C, the UE 102 initially operates 302 in a connected state and communicates 304 data with the RAN 105, as described above in scenarios 300A and 300B. After a certain period of data inactivity, the RAN 105 can transmit 305 a first DL RRC message to the UE 102 to instruct the UE 102 to transition to the inactive state, similar to event 306 or event 307. In response to or upon receiving the first RRC release message, the UE 102 transitions 308 to the inactive state, camps 310 on cell 124, and optionally receives 312 SIB(s) on the cell 124, as described above in scenarios 300A and 300B. After or in response to receiving idle/inactive measurement configuration(s) from the RRC release message or the SIB(s), the UE 102, while still in the inactive state, performs 313 measurements on one or more carrier frequencies, similar to event 314 or event 315. At a later time, the UE 102 in the inactive state initiates 316 EDT, and in response to or after initiating 316 EDT, the UE 102 suspends 318 performing measurements on one or more carrier frequencies initially started at event 313, as described above in scenarios 300A and 300B. During event 318, the UE 102 can transmit 320 initial UL MAC PDU to RAN 105 on cell 124, and in response, the RAN 105 refrains from transitioning the UE 102 to a connected state and communicates 322 data with the UE 102 operating in the inactive state, as described above in scenarios 300A and 300B.

At a later time, while performing EDT, the UE 102 detects 325 failure during EDT. In some implementations, the UE 102 may detect that failure occurs during EDT if a timer expires or a counter has reached a maximum value. In other implementations, the failure can be a security check failure (e.g., integrity check failure) during EDT. In yet other implementations, the UE 102 can detect failure if measurement of a signal strength or quality during EDT is below threshold(s). In yet other implementations, the failure can be a radio link failure. The UE can detect the radio link failure for EDT in a similar way as detecting a radio link failure for a connected state as specified in 3GPP specifications 38.133 or 36.133.

In response to detecting the failure, the UE 102 remains in the inactive state and stops 327 EDT. The UE 102 resumes 328 performing measurements on one or more carrier frequencies in response to stopping 327 EDT in some implementations. In cases where the inactive state is the RRC_INACTIVE state, the UE 102 in some implementations can transition to the RRC_IDLE state from the RRC_INACTIVE.

Figure 3D:
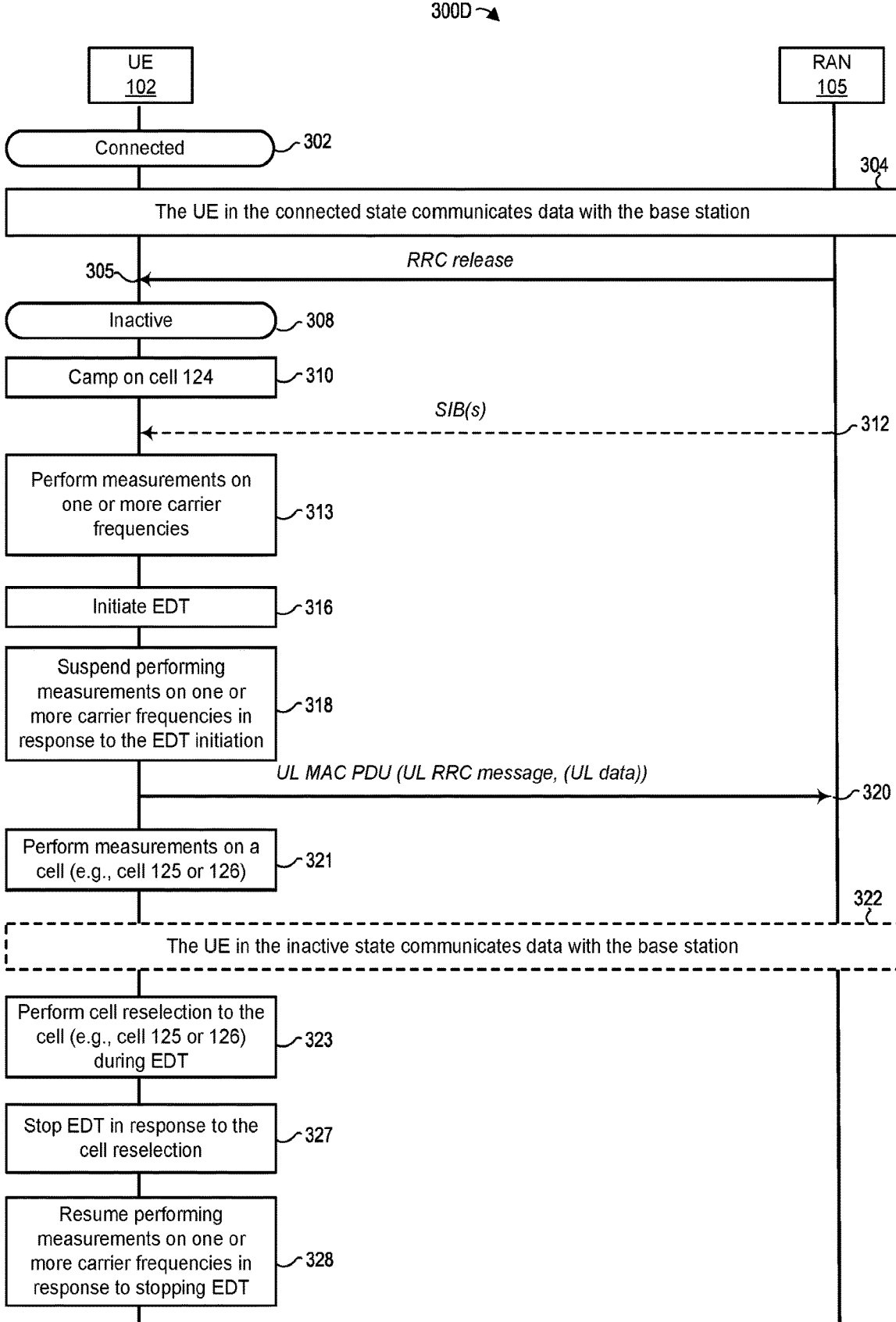
FIG. 3D is an example message sequence similar to the message sequence of FIG. 3A, but with the UE resuming the measurements upon stopping early data communication in response to performing cell reselection.

Turning to FIG. 3D, a scenario 300D is similar to scenario 300C, except that whereas the UE 102 in scenario 300C stops 327 EDT in response to detecting 325 a failure during EDT, the UE 102 in scenario 300D stops 327 EDT in response to performing 323 a cell reselection procedure during EDT.

In scenario 300D, the UE 102 initially operates 302 in a connected state, and proceeds to events 304, 305, 308, 310, 312, 313, 316, 318, 320, and 322 as described above in scenario 300C. After initiating 316 EDT, the UE 102 performs 321 measurements on a new cell (e.g., cell 125 or 126) during EDT. Based on the measurements at event 321, if the UE 102 determines that the new cell provides a more favorable connection than that of serving cell 124, or otherwise determines that the quality of a communication channel in serving cell 124 is degrading, the UE 102 performs 323 cell reselection to the new cell to establish an RRC connection to the RAN 105 via the new cell. In some implementations of this cell reselection procedure, the UE 102 can determine cell ranks for the serving cell 124 and one or more neighboring cells (e.g., cells 125 and 126) based in part on cell reselection offsets received from the RAN 105.

In response to performing the cell reselection procedure, the UE 102 remains in the inactive state and stops 327 EDT. The UE 102 resumes 328 performing measurements on one or more carrier frequencies in response to stopping 327 EDT in some implementations.

FIGS. 4A-10 are flow diagrams depicting example methods that a RAN (e.g., RAN 105) or a UE (e.g., the UE 102) can implement to manage inter-frequency measurements while the UE 102 operates in idle (or inactive) state.

Figure 4A:
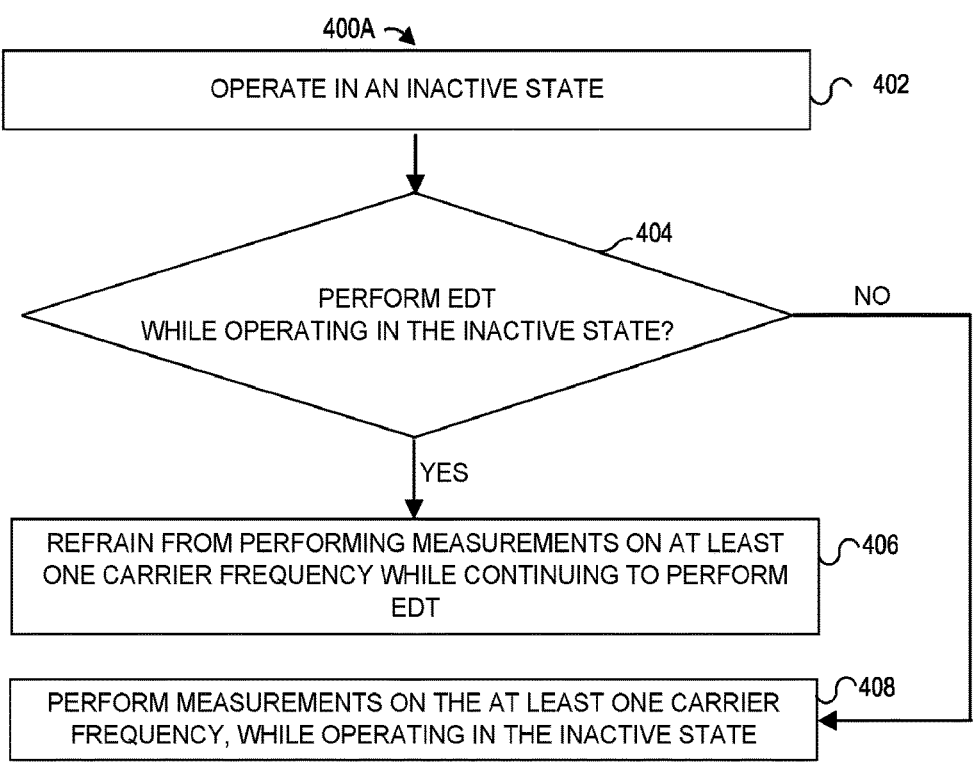
FIG. 4A is a flow diagram of an example method for determining whether to suspend inter-frequency measurements based on whether the UE is performing early data communication, which can be implemented in the UE of FIG. 1A.

Turning first to FIG. 4A, a UE (e.g., the UE 102) can implement an example method 400A to determine whether to suspend inter-frequency measurements based on whether the UE is performing early data communication with a RAN (e.g., RAN 105) (e.g., in scenarios 300A, 300B, 300C, and 300D).

At block 402, the UE initially operates in an inactive state (e.g., in event 308).

At block 404, if the UE determines not to initiate EDT while operating in the inactive state, the UE proceeds to performing measurements on at least one carrier frequency while operating in the inactive state at block 408 (e.g., in events 313, 314, 315). In some implementations, the UE can determine which carrier frequenc(ies) to measure based on information indicated in SIB(s) or a measurement configuration received from the RAN. However, if the UE at block 404 determines to initiate EDT while operating in the inactive state, the UE at block 406 refrains from performing measurements on at least one carrier frequency (e.g., in event 318) while performing EDT. As such, the UE can prevent inter-frequency measurements from interrupting EDT, thereby prioritizing EDT over inter-frequency measurements.

In some implementations, the UE can be configured to measure multiple carrier frequencies indicated, e.g., via the SIB(s) or a measurement configuration, by the RAN. In such implementations, and with reference to FIG. 4B that illustrates a method 400B similar to method 400A, when the UE determines to perform EDT, the UE at block 407 can refrain from performing measurements on some, but not all, of the multiple carrier frequencies. For example, the UE can refrain from performing measurements on a first subset of carrier frequencies (e.g., including non-serving carrier frequencies of non-serving cells (e.g., cells 125, 126)), but perform measurements on a second subset of carrier frequencies (e.g., a serving carrier frequency of the same serving cell (e.g., cell 124) via which the UE is performing EDT or a non-serving carrier frequency of a non-serving cell close to the serving carrier frequency). As such, the UE can prevent measurements on some of the carrier frequencies from interrupting EDT. If the UE determines not to perform EDT, the UE need not be limited to performing measurements on certain carrier frequencies, and thus proceeds to performing measurements on all of the multiple carrier frequencies while operating in the inactive state, as shown in block 409.

Turning to FIG. 5A, whereas a UE, e.g., as illustrated in FIGS. 3A-3D, can prioritize EDT over inter-frequency measurements, a UE (e.g., the UE 102) as illustrated in FIG. 5A can implement an example method 500A to concurrently perform EDT with a RAN (e.g., RAN 105) and inter-frequency measurements while the UE operates in an inactive state. As will be discussed below, in some implementations, the UE can manage inter-frequency measurements that includes switching from a first receiver to a second receiver upon initiating early data communications.

At block 502, the UE, while operating in an inactive state, initially performs inter-frequency measurements using the first receiver of the UE.

At block 504, the UE initiates, or at least determines to initiate, EDT while operating in the inactive state. The UE determines to use the first receiver to receive DL data from the RAN during EDT.

In order to concurrently perform EDT and inter-frequency measurements in some implementations, the UE determines to offload the inter-frequency measurements previously performed by the first receiver, to the second receiver of the UE. As such, at block 506, the UE activates the second receiver in response to initiating or determining to initiate EDT. In this way, the UE at block 508 can switch from the first receiver to the second receiver to perform inter-frequency measurements using the second receiver, while the UE continues to perform EDT using the first receiver.

When the UE at block 510 determines to stop or otherwise completes performing EDT while in the inactive state (e.g., in response to receiving an RRC release message from the RAN, detecting failure during EDT, or performing cell reselection), the UE at block 512 can deactivate the second receiver in response to stopping EDT. At block 514, in some implementations, the UE can resume inter-frequency measurements using the first receiver instead of the deactivated second receiver. For example, if there are still measurements to be performed on any remaining carrier frequenc(ies) that have yet not been measured by the first receiver at block 502 or by the second receiver at block 508, the UE can resume measurements on those remaining carrier frequenc(ies) using the first receiver.

Figures 5B, 5C:
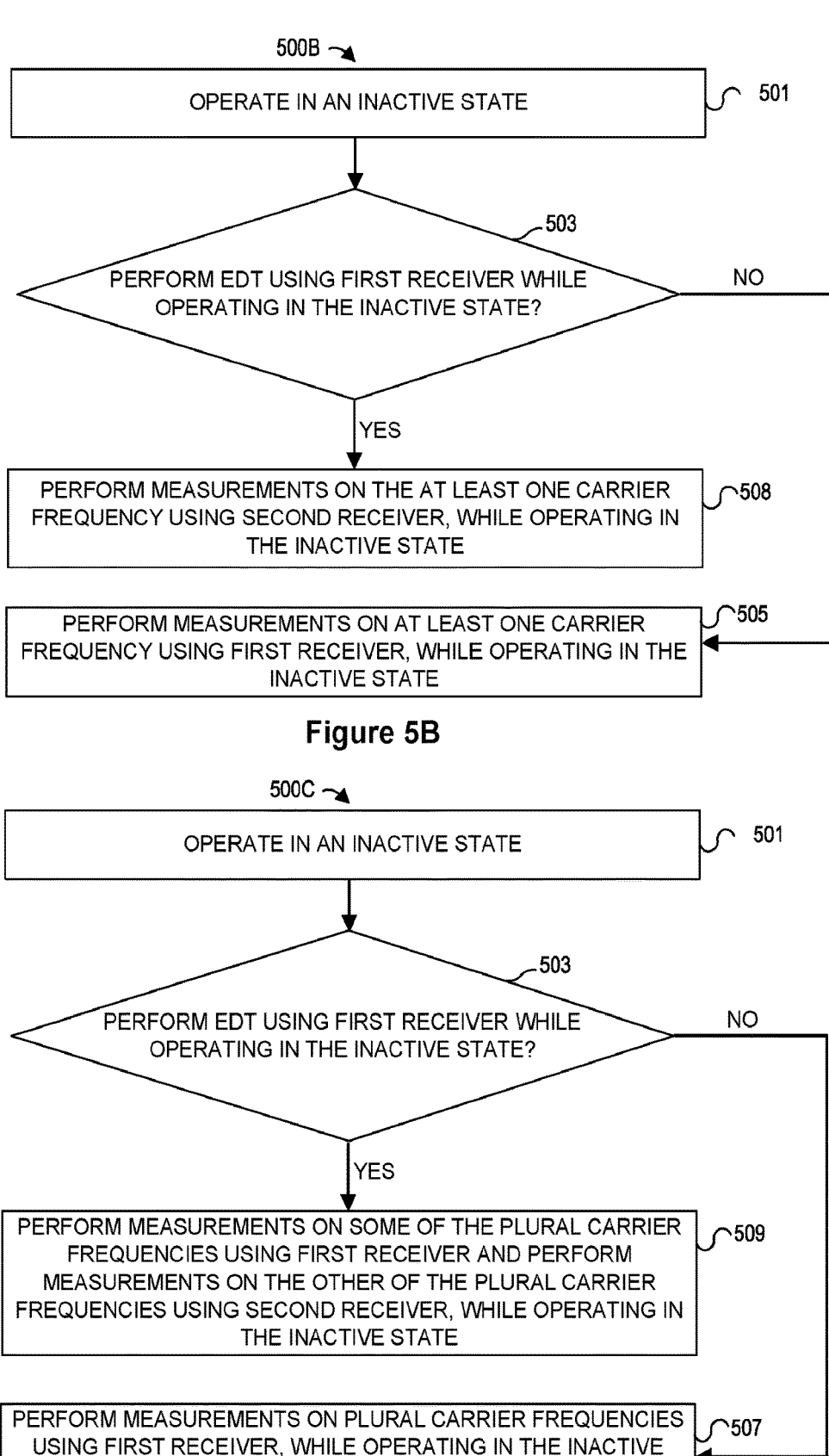
FIG. 5B is a flow diagram of an example method that includes choosing between first and second receivers for inter-frequency measurements based on whether the UE is performing early data communications on the first receiver, which can be implemented in the UE of FIG. 1A.
FIG. 5C is a flow diagram of an example method that includes performing some inter-frequency measurements on a first receiver and some inter-frequency measurements on a second receiver, when the UE performs early data communications on the first receiver, which can be implemented in the UE of FIG. 1A.

Turning to FIG. 5B, a UE (e.g., the UE 102) can implement an example method 500B to choose between a first or a second receiver for inter-frequency measurements based on whether the UE is performing early data communications with a RAN (e.g., RAN 105) on the first receiver.

At block 501, the UE initially operates in an inactive state (e.g., in event 308).

At block 503, if the UE determines not to initiate EDT using a first receiver while operating in the inactive state, the UE proceeds to performing inter-frequency measurements while operating in the inactive state using the first receiver at block 505. In some implementations, the UE can determine which carrier frequenc(ies) to measure based on information indicated in SIB(s) or a measurement configuration received from the RAN. However, if the UE at block 503 determines to initiate EDT using the first receiver while operating in the inactive state, the UE at block 508 performs inter-frequency measurements using the second receiver instead of the first receiver. As such, the UE can use the first receiver to perform EDT, and concurrently, perform inter-frequency measurements using the second receiver.

In some implementations, the UE can be configured to measure multiple carrier frequencies indicated, e.g., via the SIB(s) or a measurement configuration, by the RAN. In such implementations, and with reference to FIG. 5C that illustrates a method 500C similar to method 500B, when the UE determines to perform EDT using the first receiver, the UE at block 509 can perform measurements on some of the multiple carrier frequencies using the first receiver, and perform measurements on other carrier frequencies, using the second receiver. For example, the UE can use the first receiver to performing measurements on a first subset of carrier frequencies (e.g., including a serving carrier frequency of the same serving cell (e.g., cell 124) via which the UE is performing EDT), and use the second receiver to perform measurements on a second subset of carrier frequencies (e.g., non-serving carrier frequencies of non-serving cells (e.g., cells 125, 126)). If the UE determines not to perform EDT using the first receiver, the UE need not be limited to performing measurements on certain carrier frequencies when using the first receiver, and thus proceeds to performing measurements on all of the multiple carrier frequencies using the first receiver while operating in the inactive state, as shown in block 507.

Figure 6A:
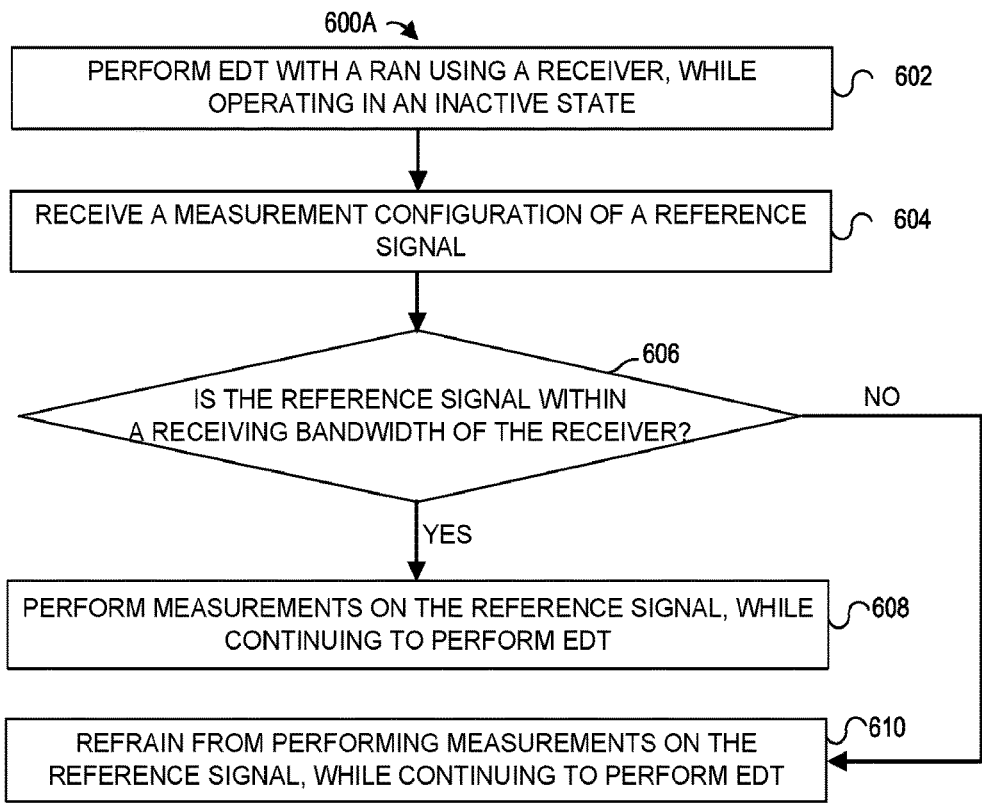
FIG. 6A is a flow diagram of an example method in which a UE determines whether it can concurrently perform early data communication and carrier frequency measurements based on whether a reference signal for the measurements is within the receiving bandwidth of the receiver on which the UE performs early data communication, which can be implemented in the UE of FIG. 1A.
Figure 6B:
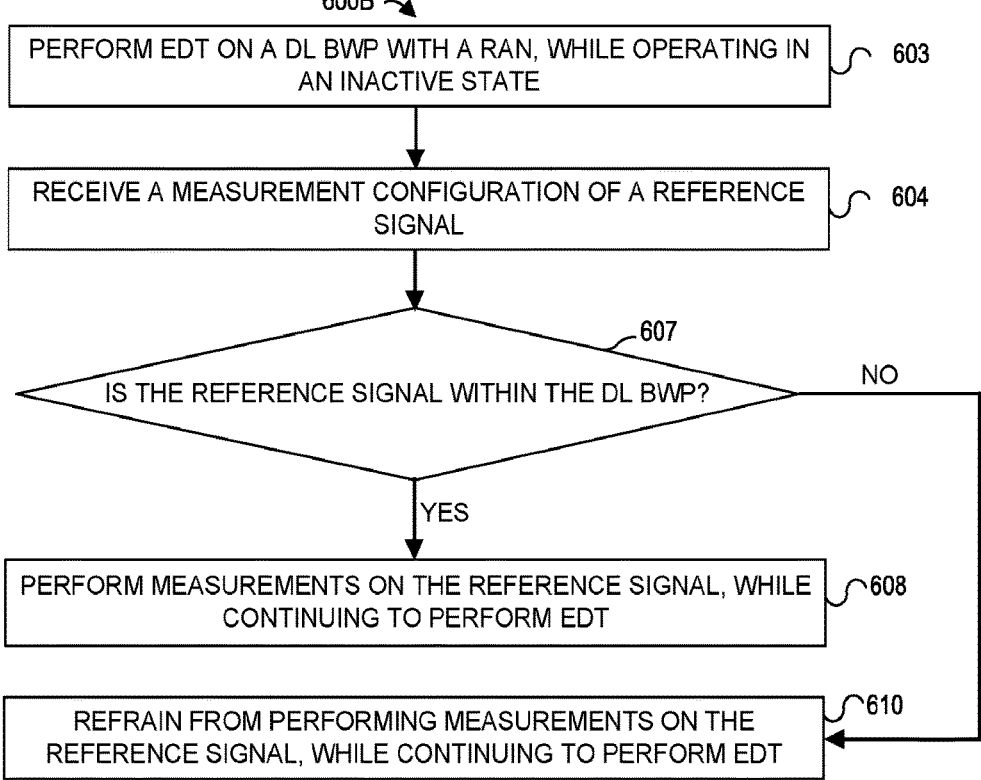
FIG. 6B is a flow diagram of an example method similar to the method of FIG. 6A, with the UE determining whether the reference signal is within a downlink (DL) bandwidth part (BWP) of the receiver on which the UE performs early data communication.

Turning to FIG. 6A, a UE (e.g., the UE 102) can implement an example method 600A to determine whether it can concurrently perform early data communication with a RAN (e.g., RAN 105) and inter-frequency measurements based on whether a reference signal for the inter-frequency measurements is within a receiving bandwidth of a receiver on which the UE performs the early data communication. The reference signal can be a primary synchronization signal (PSS), secondary synchronization signal (SSS), synchronization signal/PBCH block (SSB), channel state information (CSI) reference signal, and/or a positioning reference signal (PRS).

At block 602, the UE (e.g., via a receiver), while operating in an inactive state, performs EDT with the RAN. At block 604, the UE receives, from the RAN, a measurement configuration of the reference signal. The measurement configuration can include a particular carrier frequency of the reference signal, and/or a particular measurement reporting configuration upon which to perform measurement or measurement reporting, for example. In some implementations, the UE can receive the measurement configuration in an RRC message (e.g., RRC release message) or in an SIB from the RAN. Although block 604 is illustrated after block 602, the UE in other implementations can receive the measurement configuration of the reference signal prior to performing EDT with the RAN.

If the UE at block 606 determines that the reference signal is within a receiving bandwidth of the UE during EDT (e.g., the UE determines that the carrier frequency of the reference signal is within the receiving bandwidth of the receiver on which the UE performs EDT), the UE at block 608, using the receiver, performs measurements on the reference signal while continuing to perform EDT while in the inactive state. That is, the UE concurrently performs EDT and carrier frequency measurements using the receiver when the UE determines that the reference signal is within the current receiving bandwidth of the UE. On the other hand, if the UE at block 606 determines that the reference signal is outside the current receiving bandwidth, the UE at block 610 refrains from performing carrier frequency measurements on the reference signal while continuing to perform EDT while in the inactive state using the receiver. Refraining from performing measurements on the reference signal prevents interruption of EDT due to retuning of the receiver.

In some implementations, the RAN can configure the UE to operate within certain bandwidth parts (BWP), or a portion of the receiving bandwidth made up of a contiguous set of physical resource blocks, when accessing the RAN. The BWP can include a downlink (DL) BWP and an uplink (UL) BWP. In one such implementation, and with reference to FIG. 6B that illustrates a method 600B similar to method 600A, the UE (e.g., via receiver) at block 603 can be configured by the RAN to perform EDT on a DL BWP. After receiving the measurement configuration of the reference signal at block 604 described above in FIG. 6A, the UE at block 607 determines whether the reference signal is within or outside the DL BWP. If the UE at block 607 determines that the reference signal is within the DL BWP of the UE (e.g., the receiving DL BWP of the receiver on which the UE performs EDT), the UE at block 608 performs measurements on the reference signal while continuing to perform EDT while in the inactive state using the receiver. On the other hand, if the UE at block 607 determines that the reference signal is outside the DL BWP, the UE at block 610 refrains from performing the measurements on the reference signal while continuing to perform EDT while in the inactive state using the receiver.

Turning to FIG. 6C, the UE can implement an example method 600C to determine whether it can concurrently perform early data communication and carrier frequency measurements based on whether a reference signal for the measurements is within the receiving bandwidth of the receiver on which the UE performs early data communication, similar to method 600A. However, whereas the UE of method 600A refrains from performing measurements on the reference signal while continuing to perform EDT using the receiver if the UE determines that the reference signal is outside the receiving bandwidth, the UE of method 600C can alternatively prioritize the carrier frequency measurements over EDT. That is, if the UE at block 606 determines that the reference signal is outside the receiving bandwidth, the UE at block 611 can suspend EDT and continue performing carrier frequency measurements on the reference signal using the receiver. In some implementations, the UE can prioritize the carrier frequency measurements over EDT if the reference signal is a PRS. Otherwise, the UE can prioritize EDT over the carrier frequency measurements.

Turning to FIG. 6D, method 600D is similar to method 600B. However, whereas the UE of method 600B refrains from performing measurements on the reference signal while continuing to perform EDT using the receiver if the UE determines that the reference signal is outside the DL BWP, the UE of method 600D can alternatively prioritize the carrier frequency measurements over EDT. That is, if the UE at block 607 determines that the reference signal is outside the DL BWP, the UE at block 611 can suspend EDT and continue performing carrier frequency measurements on the reference signal.

Turning to FIG. 7A, a RAN (e.g., the RAN 105) can implement an example method 700A to determine how the RAN should format an RRC message for a UE (e.g., the UE 102), depending on whether the RAN configures the UE to perform inter-frequency measurements or early data communication (e.g., in scenarios 300A, 300B, 300C, 300D, 300E, and 300F).

At block 702, the RAN determines to send an RRC message (e.g., an RRC release message) to the UE. In some implementations, the RAN, while communicating with the UE in a connected state, can determine to send the RRC message to transition the UE from the connected state to an inactive state (e.g., in events 305, 306, 307). In other implementations, the RAN, while communicating with the UE in an inactive state, can determine to send the RRC message to keep the UE in the inactive state.

To determine how to format the RRC message, the RAN at block 704 first determines whether to configure the UE to perform EDT. If the RAN determines to enable the UE to perform EDT, the RAN can include an EDT configuration in the RRC message, but exclude a measurement configuration in the RRC message, and subsequently send the RRC message to the UE, as shown in block 706 (e.g., in events 305, 306). Consequently, the UE can later initiate EDT in accordance with the EDT configuration, but not perform inter-frequency measurements while performing EDT due to the omission of the measurement configuration in the RRC message, thereby preventing interruption of EDT.

On the other hand, if the RAN determines to not configure the UE to perform EDT, the RAN can exclude the EDT configuration in the RRC message, but include the measurement configuration in the RRC message, and subsequently send the RRC message to the UE, as shown in block 708. Consequently, the UE is able to perform inter-frequency measurements upon receiving the RRC message when the UE is not performing EDT.

In some implementations, the RAN can select a particular measurement configuration for inclusion in the RRC message depending on whether the RAN also configures the UE to perform EDT. That is, rather than including the EDT configuration and excluding any measurement configuration in the RRC message to prevent the UE from performing inter-frequency measurements while performing EDT, the RAN can include both the EDT configuration and a selected measurement configuration in the RRC message, to enable the UE to perform inter-frequency measurements on selected carrier frequenc(ies) only as indicated in the selected measurement configuration, while performing EDT. In one such implementation, and with reference to FIG. 7B that illustrates a method 700B similar to method 700A, when the RAN determines to configure the UE to perform EDT, the RAN at block 707 can send to the UE via the RRC message, in addition to the EDT configuration, a first measurement configuration, but not a second measurement configuration, to instruct the UE to measure a first subset of carrier frequencies indicated in the first measurement configuration but not a second subset of carrier frequencies indicated in the second measurement configuration during EDT. The first subset and the second subset can be, but need not be, mutually exclusive. For example, the first subset of carrier frequencies can include the serving carrier frequency on which the UE performs EDT via a serving cell (e.g., cell 124), and the second subset of carrier frequencies can include non-serving carrier frequencies of other cells (e.g., cells 125, 126). In another such implementation, the RAN at block 707 can send to the UE both the first measurement configuration and the second measurement configuration, either in the same RRC message or separate RRC messages, so that the UE is capable of measuring both the first and second subsets of carrier frequencies. For example, as discussed above in method 500C, the UE can consequently perform measurements on the first subset of carrier frequencies using a first receiver, and perform measurements on the second subset of carrier frequencies using a second receiver.

When the RAN determines not to configure the UE to perform EDT, the RAN at block 709 can send to the UE via the RRC message the second measurement configuration, to instruct the UE to measure the second set of carrier frequenc(ies) indicated in the second measurement configuration. In this case, the second set of carrier frequenc(ies) can be any one or more (or all) of the multiple carrier frequencies described in block 507 of FIG. 5C described above.

In some implementations, instead of selecting which measurement configurations to include in an RRC message for the UE depending on whether the RAN configured the UE to perform EDT, the RAN can broadcast measurement configurations including indications of certain carrier frequencies to the UE, and the UE can then select which of the measurements configurations to apply depending on whether the UE is currently performing early data communication. In one such implementation, and with reference to FIG. 7C that illustrates a method 700C, the RAN at block 710 broadcasts a first SIB including first frequency information indicating at least one first carrier frequency for the UE to measure while the UE performs EDT. For example, the at least one first carrier frequency can be one of the carrier frequencies included in the first set of carrier frequencies described above with reference to FIG. 7B. At block 712, the RAN broadcasts a second SIB including second frequency information indicating at least one second carrier frequency for the UE to measure while the UE is not performing EDT. For example, the at least one second carrier frequency can be any one or more (or all) of multiple carrier frequencies described in block 507 of FIG. 5C described above. In method 700C, the first SIB and second SIB may be the same SIB, or different SIBs.

Figure 4B:
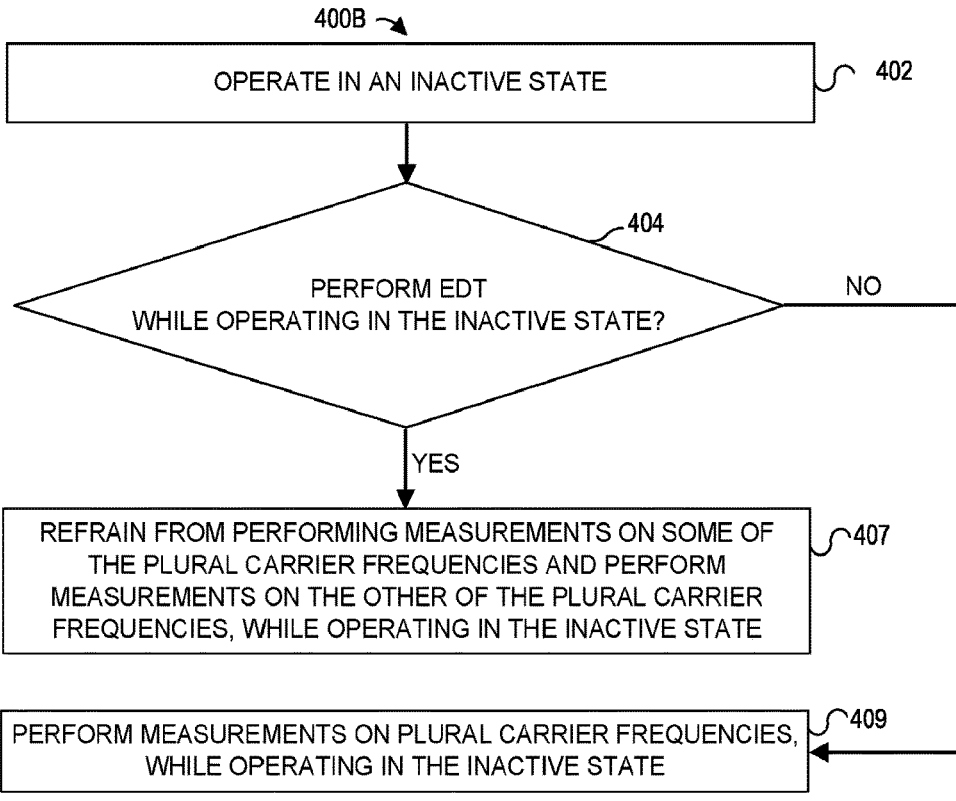
FIG. 4B is a flow diagram of an example method similar to the method of FIG. 4A, but where the UE suspends performing measurements on some, but not all, of the frequencies.
Figure 8:
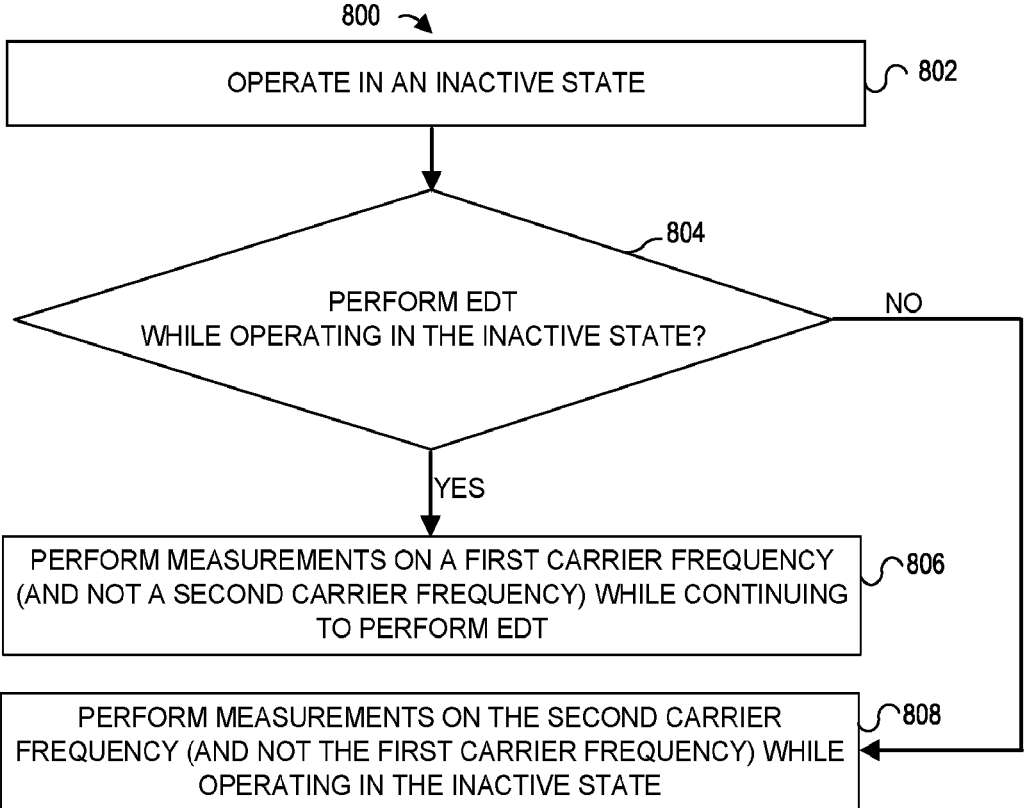
FIG. 8 is a flow diagram of an example method in which a UE determines whether it should measure particular carrier frequencies depending on whether the UE is performing early data communication, which can be implemented in the UE of FIG. 1A.

Turning to FIG. 8, a UE (e.g., the UE 102) can implement an example method 800 similar to method 400B described in FIG. 4B above to measure certain carrier frequencies depending on whether the UE is performing EDT with a RAN (e.g., the RAN 105). Generally, the method 800 is related to method 700B and/or 700C except from the perspective of the UE. That is, in accordance with indications of certain carrier frequencies provided by the RAN in RRC message(s) or SIB(s), the UE determines which of those certain carrier frequencies to measure depending on whether the UE is currently performing early data communication.

Initially, the UE at block 802 operates in an inactive state, and at block 804 determines whether to initiate EDT while operating in the inactive state, similar to respective blocks 402 and 404 of method 400B described in FIG. 4B.

When the UE is performing EDT, the UE at block 806 performs measurements on at least one of the carrier frequencies (i.e., a first carrier frequency) indicated by the RAN, but refrains from performing measurements on at least another one of the carrier frequencies (i.e., a second carrier frequency) indicated by the RAN. If the UE has not initiated EDT, the UE at block 808 performs measurements on the second carrier frequency, but refrains from performing measurements on the first carrier frequency.

Turning to FIG. 9, a UE (e.g., the UE 102) can implement an example method 900 to determine whether it should suspend at least some inter-frequency measurements depending on whether the UE is performing early data communication with a RAN (e.g., the RAN 105).

At block 902, the UE determines one or more carrier frequencies for inter-frequency measurements while a radio connection between the UE and the RAN is not active (e.g., in events 312, 305, 307, block 604).

At block 904, the UE determines that data is available for early data communication between the UE and a CN (e.g., the CN 110). For example, the UE can receive a paging message from the RAN indicating that the RAN has DL data to transmit during an early data communication session. As another example, the UE can have UL data to transmit to the RAN during an early data communication session.

At block 906, the UE determines whether to suspend (i) inter-frequency measurements on at least one of the carrier frequencies or (ii) the early data communication. In some implementations, the UE determines to suspend the inter-frequency measurements when determining to perform the early data communication, thereby prioritizing the early data communication over the inter-frequency measurements (e.g., in event 318, blocks 406, 407, 610, 806, 808). In some implementations, the UE determines to concurrently perform the inter-frequency measurements and the early data communication (e.g., in blocks 508, 509). In some implementations, the UE determines to perform the inter-frequency measurements when determining to suspend the early data communication, thereby prioritizing the inter-frequency measurements over the early data communication (e.g., in block 611).

Turning to FIG. 10, a RAN (e.g., RAN 105) can implement an example method 1000 to manage inter-frequency measurements and early data communication with the UE (e.g., the UE 102).

At block 1002, the RAN determines whether to configure the UE to perform inter-frequency measurements on one or more carrier frequencies while a radio connection between a user equipment (UE) and the RAN is not active, in view of whether the UE should be configured to perform early data communication. In some implementations, the RAN determines to not configure the UE to perform the inter-frequency measurements when determining to configure the UE to perform the early data communication, thereby prioritizing the early data communication over the inter-frequency measurements (e.g., in event 318, block 706). In some implementations, the RAN determines to configure the UE to concurrently perform the inter-frequency measurements and the early data communication (e.g., in block 707). In some implementations, the RAN determines to configure the UE to perform the inter-frequency measurements when determining to not configure the UE to perform the early data communication, thereby prioritizing the inter-frequency measurements over the early data communication (e.g., in block 708, 709).

At block 1004, the RAN transmits, to the UE, a configuration related to at least one of inter-frequency measurements and early data communication. In some implementations, the RAN transmits measurement configuration(s) and an early data communication in RRC release message(s) to the UE (e.g., in events 305, 307, blocks 706, 707, 708, 709). In other implementations, the RAN provides measurement configuration(s) over a system information broadcast (e.g., in event 312, blocks 710, 712).

The following description may be applied to the description above.

In some implementations, "message" is used and can be replaced by "information element (IE)." In some implementations, "IE" is used and can be replaced by "field." In some implementations, "configuration" can be replaced by "configurations" or "configuration parameters." In some implementations, "EDT" or "early data transmission" can be replaced by "early data communication." In some implementations, "early data communication" can be replaced by "small data communication," and "early data transmission" can be replaced by "small data transmission." In some implementations, "communicating data via RB(s)" can be replaced by "communicate data associated to RB(s)" or "communicate data on RB(s)," and "communicate" can be replaced by "transmit," "receive," or "transmit and receive."

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Example 1. A method performed by a user equipment (UE) for managing inter-frequency measurements, the method comprising: determining, by processing hardware, one or more carrier frequencies for inter-frequency measurements while a radio connection between the UE and the RAN is not active; determining, by the processing hardware, that data is available for early data communication between the UE and a core network (CN); and determining, by the processing hardware, whether to suspend (i) inter-frequency measurements on at least one of the carrier frequencies or (ii) the early data communication.

Example 2. The method of Example 1, wherein the determining whether to suspend the inter-frequency measurements or the early data communication includes: determining to perform the early data communication; and determining to suspend the inter-frequency measurements on the at least one of the carrier frequencies.

Example 3. The method of Example 2, further comprising: stopping the early data communication in response to a trigger event; and resuming the inter-frequency measurements on the at least one of the carrier frequencies that was previously determined to be suspended in response to stopping the early data communication.

Example 4. The method of Example 3, wherein the trigger event is one of: receiving a radio resource control (RRC) message from the RAN, detecting failure during the early data communication, or selecting a new cell.

Example 5. The method of any one of Examples 2-4, wherein the determining to suspend the inter-frequency measurements includes: determining that the at least one of the carrier frequencies is outside a receiving bandwidth of the UE.

Example 6. The method of any one of Examples 2-4, wherein the determining to suspend the inter-frequency measurements includes: determining that the at least one of the carrier frequencies is outside a bandwidth part (BWP) in which the UE is performing the early data communication.

Example 7. The method of Example 1, wherein the determining whether to suspend the inter-frequency measurements or the early data communication includes: determining to perform the early data communication; and determining to perform the inter-frequency measurements.

Example 8. The method of Example 7, further comprising: performing the early data communication using a first receiver of the UE; and performing the inter-frequency measurements using a second receiver of the UE.

Example 9. The method of Example 8, further comprising: in response to stopping the early data communication, using the first receiver to perform the inter-frequency measurements.

Example 10. The method of Example 9, wherein stopping the early data communication is in response to one of: receiving an RRC message from the RAN, detecting failure during the early data communication, or selecting a new cell.

Example 11. The method of Example 7, further comprising: performing the early data communication using a first receiver of the UE; performing the inter-frequency measurements on a first subset of the carrier frequencies using the first receiver; and performing the inter-frequency measurements on a second subset of the carrier frequencies using a second receiver of the UE.

Example 12. The method of Example 1, wherein the determining whether to suspend the inter-frequency measurements or the early data communication includes: determining to suspend the early data communication; and determining to perform the inter-frequency measurements.

Example 13. The method of Example 12, wherein the determining to suspend the early data communication is in response to determining that at least one of the carrier frequencies is outside a receiving bandwidth of the UE.

Example 14. The method of any one of the preceding Examples, wherein the determining the one or more carrier frequencies for inter-frequency measurements includes: receiving, from the RAN, an indication of the one or more carrier frequencies.

Example 15. The method of Example 14, wherein the receiving the indication of the one or more carrier frequencies includes: receiving the indication in one or more RRC messages.

Example 16. The method of Example 14, wherein the receiving the indication of the one or more carrier frequencies includes: receiving the indication in one or more system information blocks (SIBs).

Example 17. A UE including processing hardware and configured to implement a method according to any one of the preceding Examples.

Example 18. A method, implemented in a radio access network (RAN), for managing inter-frequency measurements, the method comprising: determining, by processing hardware, whether to configure a user equipment (UE) to perform inter-frequency measurements on one or more carrier frequencies while a radio connection between a user equipment (UE) and the RAN is not active, in view of whether the UE should be configured to perform early data communication; and transmitting, by the processing hardware and to the UE, a configuration related to at least one of inter-frequency measurements and early data communication.

Example 19. The method of Example 18, wherein the determining whether to configure the UE to perform inter-frequency measurements includes: determining to configure the UE to perform the early data communication; and determining to not configure the UE to perform the inter-frequency measurements.

Example 20. The method of Example 19, wherein the transmitting the configuration includes: transmitting an early data communication configuration to enable the UE to perform the early data communication; and omit transmitting an inter-frequency measurement configuration, which prevents the UE from performing the inter-frequency measurements while performing the early data communication.

Example 21. The method of Example 20, wherein the transmitting the configuration includes: transmitting a radio resource control (RRC) message including the early data communication configuration and excluding the inter-frequency measurement configuration.

Example 22. The method of Example 18, wherein the determining whether to configure the UE to perform inter-frequency measurements includes: determining to not configure the UE to perform the early data communication; and determining to configure the UE to perform the inter-frequency measurements.

Example 23. The method of Example 22, wherein the transmitting the configuration includes: omit transmitting an early data communication configuration to prevent the UE from performing the early data communication; and transmitting an inter-frequency measurement configuration, which enables the UE to perform the inter-frequency measurements.

Example 24. The method of Example 23, wherein the transmitting the configuration includes: transmitting an RRC message excluding the early data communication configuration and including the inter-frequency measurement configuration.

Example 25. The method of Example 18, wherein the determining whether to configure the UE to perform inter-frequency measurements includes: determining to configure the UE to perform the early data communication; and determining to configure the UE to perform the inter-frequency measurements.

Example 26. The method of Example 25, wherein the transmitting the configuration includes: transmitting an early data communication configuration to enable the UE to perform the early data communication; and transmitting an inter-frequency measurement configuration, which enables the UE to perform the inter-frequency measurements while performing the early data communication.

Example 27. The method of Example 26, wherein the inter-frequency measurement configuration includes: a first indication of a first carrier frequency for the UE to measure while performing the early data communication; and a second indication of a second carrier frequency for the UE to not measure while performing the early data communication.

Example 28. The method of Example 26 or 27, wherein the transmitting the configuration includes: transmitting an RRC message including the early data communication configuration and the inter-frequency measurement configuration.

Example 29. The method of Example 18, wherein the transmitting the configuration includes: broadcasting a first system information block (SIB) indicating a first carrier frequency for the UE to measure while performing the early data communication; and broadcasting a second SIB indicating a second carrier frequency for the UE to measure while not performing the early data communication.

Example 30. The method of Example 29, wherein the first SIB and the second SIB are the same SIB.

Example 31. The method of Example 29, wherein the first SIB and the second SIB are different SIBs.

Example 32. A RAN including processing hardware and configured to implement a method according to any one of Examples 18-31.

What is claimed is:

1. A method performed by a user equipment (UE) for managing idle/inactive measurements, the method comprising:

determining, by the UE, a plurality of carrier frequencies for idle/inactive measurements while a radio connection between the UE and a radio access network (RAN) is inactive;

while small data transmission (SDT) is suspended between the UE and a core network (CN), performing, by the UE, the idle/inactive measurements on the plurality of carrier frequencies; and while the SDT is not suspended between the UE and a CN:

performing, by the UE, the idle/inactive measurements on a first subset of the plurality of carrier frequencies; and refraining, by the UE, from performing the idle/inactive measurements on a second subset of the plurality of carrier frequencies.

2. The method of claim 1, wherein the determining the plurality of carrier frequencies for idle/inactive measurements includes:

receiving, from the RAN, an indication of the plurality of carrier frequencies.

3. The method of claim 2, wherein the receiving the indication of the plurality of carrier frequencies includes:

receiving the indication in one or more RRC messages.

4. The method of claim 2, wherein the receiving the indication of the plurality of carrier frequencies includes:

receiving the indication in one or more system information blocks (SIBs).

5. The method of claim 4, wherein the one or more SIBs include information about performing neighboring cell measurements relevant for cell re-selection.

6. The method of claim 1, wherein the second subset of the plurality of carrier frequencies includes non-serving carrier frequencies of non-serving cells.

7. The method of claim 1, wherein the first subset of the plurality of carrier frequencies includes at least one of: a serving carrier frequency of a cell via which the UE performs the SDT, or a non-serving carrier frequency of a non-serving cell.

8. The method of claim 1, further comprising initiating, by the UE, the SDT between the UE and the CN.

9. A user equipment (UE) including processing hardware and configured to:

determine, by the UE, a plurality of carrier frequencies for idle/inactive measurements while a radio connection between the UE and a radio access network (RAN) is inactive;

while small data transmission (SDT) is suspended between the UE and a core network (CN), perform, by the UE, the idle/inactive measurements on the plurality of carrier frequencies; and while the SDT is not suspended between the UE and a CN:

perform, by the UE, the idle/inactive measurements on a first subset of the plurality of carrier frequencies; and refrain, by the UE, from performing the idle/inactive measurements on a second subset of the plurality of carrier frequencies.

* * * * *